United States Patent
Arita et al.

(10) Patent No.: US 12,151,490 B2
(45) Date of Patent: Nov. 26, 2024

(54) PRINTING APPARATUS AND CONVEYANCE APPARATUS

(71) Applicant: CANON KABUSHIKI KAISHA, Tokyo (JP)

(72) Inventors: Keisuke Arita, Kanagawa (JP); Takahide Onuma, Kanagawa (JP); Yasunori Matsumoto, Kanagawa (JP); Satoru Nitobe, Kanagawa (JP); Masashi Ito, Tokyo (JP); Yuki Emoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 17/169,184

(22) Filed: Feb. 5, 2021

(65) Prior Publication Data
US 2021/0252890 A1 Aug. 19, 2021

(30) Foreign Application Priority Data
Feb. 19, 2020 (JP) ................. 2020-026116

(51) Int. Cl.
*B41J 29/393* (2006.01)
*B41J 13/03* (2006.01)

(52) U.S. Cl.
CPC ............. *B41J 29/393* (2013.01); *B41J 13/03* (2013.01)

(58) Field of Classification Search
CPC ................................ B41J 29/393; B41J 13/03
See application file for complete search history.

(56) References Cited

U.S. PATENT DOCUMENTS

| | | | | |
|---|---|---|---|---|
| 4,734,868 A | * | 3/1988 | DeLacy | G05B 19/232 399/361 |
| 6,454,474 B1 | * | 9/2002 | Lesniak | B41J 11/0095 400/582 |
| 2008/0145101 A1 | * | 6/2008 | Seto | G03G 15/0194 399/167 |
| 2009/0140682 A1 | * | 6/2009 | Watahiki | G03G 15/1615 399/361 |
| 2010/0016106 A1 | | 1/2010 | Minemura | |

FOREIGN PATENT DOCUMENTS

| | | |
|---|---|---|
| CN | 1060432 A | 4/1992 |
| CN | 1324752 A | 12/2001 |
| CN | 101100139 A | 1/2008 |

(Continued)

*Primary Examiner* — Lam S Nguyen
(74) *Attorney, Agent, or Firm* — Canon U.S.A., Inc., IP Division

(57) ABSTRACT

A printing apparatus includes a conveyance unit to convey a print medium, a belt, a tensioner, and a control unit. The belt transmits a driving force of a drive unit to the conveyance unit. The tensioner is displaceable and makes pressure contact with the belt to generate tension. The control unit controls driving of the drive unit in a state where the tensioner is in pressure contact with the belt. The control unit performs first control in which the drive unit is driven with a first control value, which is not based on a driving amount detected by a detection unit. Where the detection unit detects the driving amount, the control unit subsequently performs second control in which the drive unit is driven with a second control value, which is based on the driving amount detected by the detection unit.

25 Claims, 19 Drawing Sheets

(56) References Cited

FOREIGN PATENT DOCUMENTS

| | | | |
|---|---|---|---|
| CN | 101629619 | A | 1/2010 |
| CN | 105346271 | A | 2/2016 |
| DE | 3911909 | A1 | 10/1990 |
| JP | H02225234 | A | 9/1990 |
| JP | H0534344 | U | 5/1993 |
| JP | 2004082532 | A | 3/2004 |
| JP | 2005-30422 | A | 2/2005 |
| JP | 2012032431 | A | 2/2012 |
| JP | 6074095 | B1 | 2/2017 |

\* cited by examiner

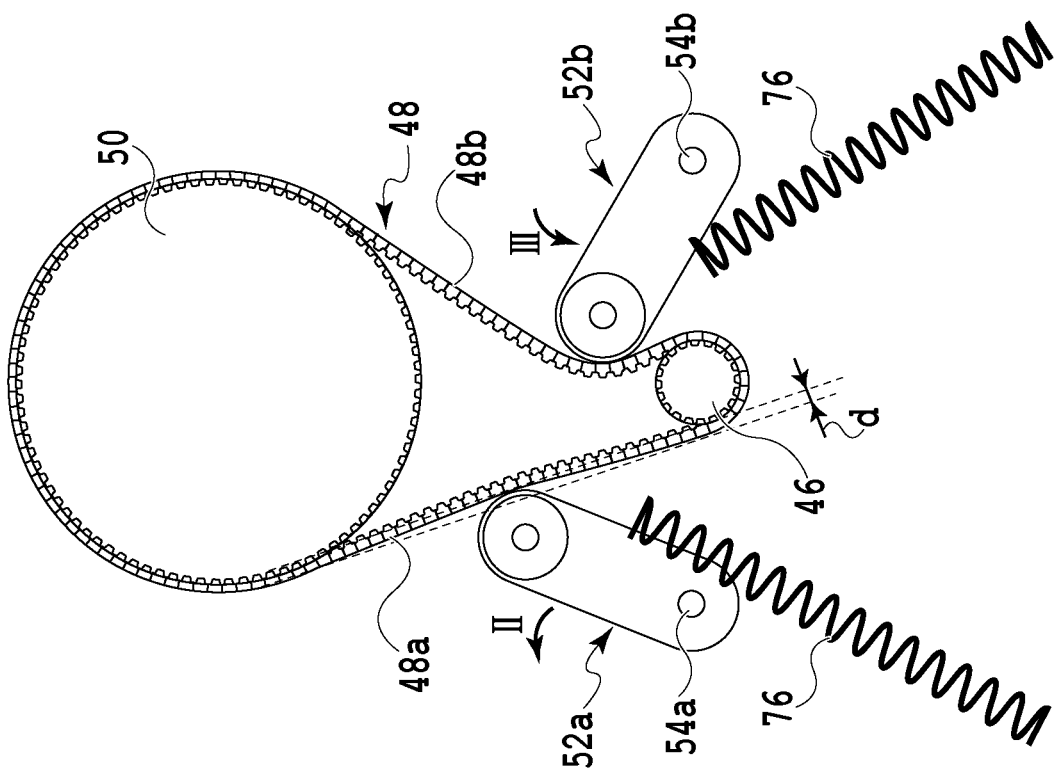
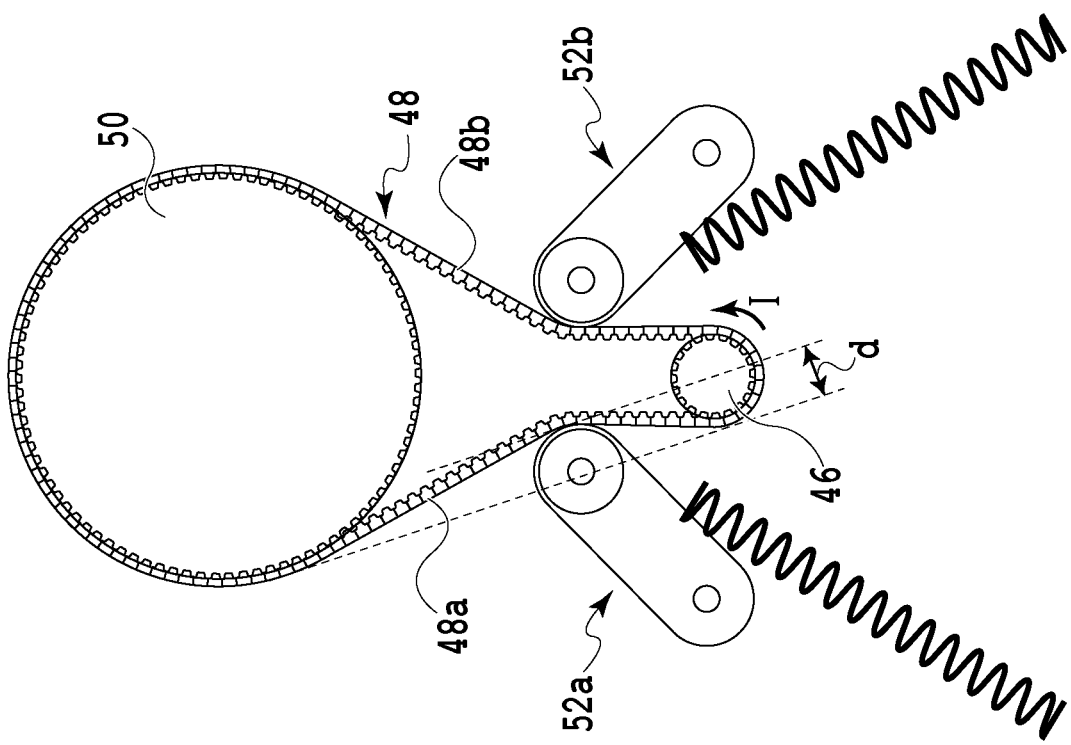

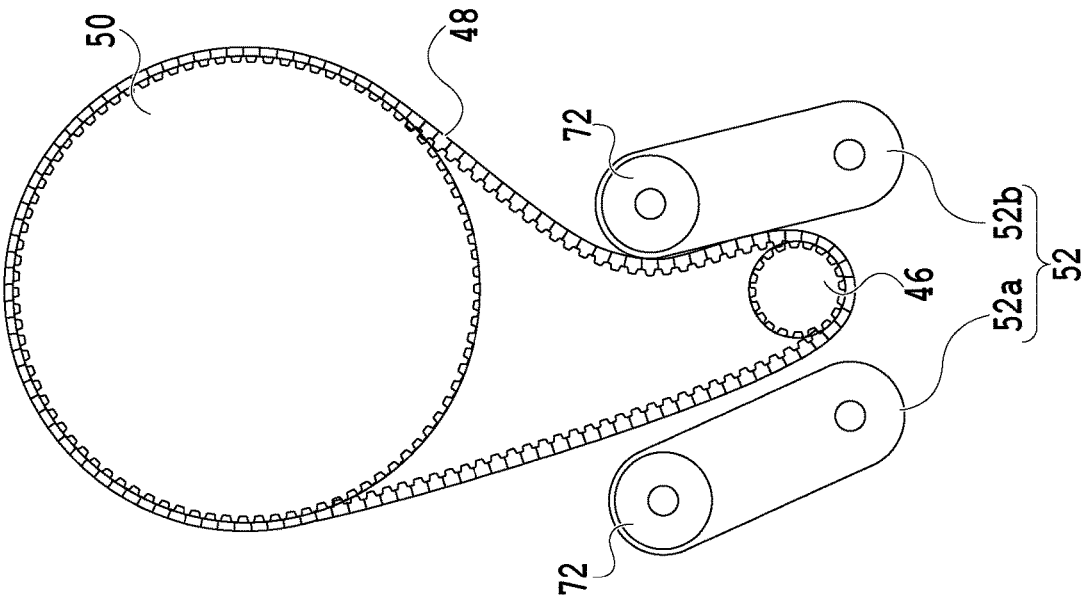
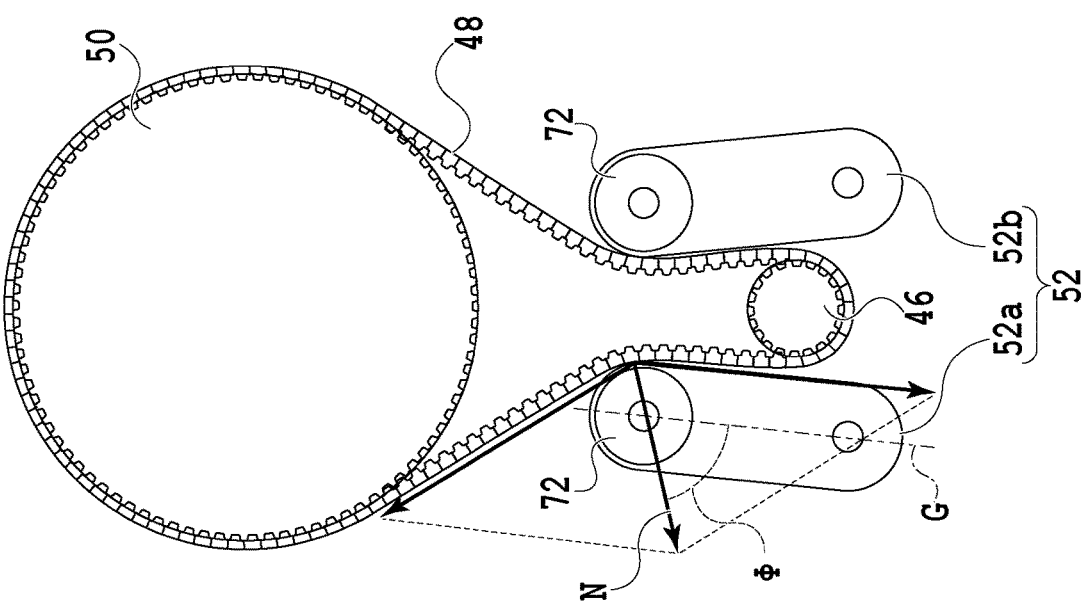

PRINTING APPARATUS AND CONVEYANCE APPARATUS

BACKGROUND

Field

The present disclosure relates to a printing apparatus and conveyance apparatus including a drive mechanism that transmits a driving force of a motor via a belt so as to drive a conveyance roller that conveys an object.

Description of the Related Art

In Japanese Patent Laid-Open No. 2005-30422, there is disclosed a technology for stabilizing the tension of a belt, which is wrapped around a drive pulley and a driven pulley, by use of tensioners provided for the spans of the belt on both sides, relatively. Specifically, the technology disclosed in Japanese Patent Laid-Open No. 2005-30422 has a configuration in which the spans on both sides are biased by the respective tensioners such that, even in a case where deflection or tension is generated on the spans on both sides along with rotation of the drive pulley, the force applied to the belt is controlled to be constant in accordance with such changes.

In a printing apparatus that requires highly accurate conveyance of a print medium, it is required to control driving of a conveyance roller with high accuracy. However, in the technology disclosed in Japanese Patent Laid-Open No. 2005-30422, when the driving is started, the driven pulley rotates after the belt in a bent and deflected state is made into a tensioned state by the tensioners. Here, in a case where the belt is transitioned from a deflected state to a tensioned state in a minute time period because of sudden acceleration of the drive pulley, etc., there is a possibility that the tensioners, which are biased to the spans, behave in vibrating manners. Accordingly, there is a possibility that the controllability of the conveyance roller, which is driven via the driven roller, decreases.

SUMMARY

The present disclosure relates to providing a technology capable of suppressing a decrease in the controllability of the conveyance roller. According to the present disclosure, it becomes possible to suppress a decrease in the controllability of a conveyance roller (conveyance unit) due to a belt.

According to an aspect of the present disclosure, a printing apparatus includes a conveyance unit configured to convey a print medium, a belt configured to transmit a driving force of a drive unit to the conveyance unit, a tensioner configured to be displaceable and make pressure contact with the belt to generate tension, and a control unit configured to control driving of the drive unit in a state where the tensioner is in pressure contact with the belt, wherein the control unit performs first control in which the drive unit is driven with a first control value, which is not based on a driving amount detected by a detection unit, and, in a case where the detection unit detects the driving amount, subsequently performs second control in which the drive unit is driven with a second control value, which is based on the driving amount detected by the detection unit.

Further features of the present disclosure will become apparent from the following description of exemplary embodiments with reference to the attached drawings.

BRIEF DESCRIPTION OF THE DRAWINGS

FIG. 7A and FIG. 7B are diagrams for explaining the operation of the belt and the tensioner when a conveyor motor is driven;

FIG. 9A and FIG. 9B are diagrams for explaining the operation of the tensioner in a case where the center of pivotal movement is positioned outside the area illustrated in FIG. 5;

DESCRIPTION OF THE EMBODIMENTS

Hereinafter, with reference to the accompanying drawings, detailed explanations are given of examples of an embodiment of a printing apparatus and a conveyance apparatus. Note that it is not intended that the following embodiments limit the present disclosure, and every combination of the characteristics explained in the present embodiments is not necessarily essential to the solution in the present disclosure. In addition, the relative positions, shapes, etc., of the constituent elements described in the embodiments are merely examples and are not intended to limit the present disclosure to the range of the examples.

First Embodiment

Figure 1:
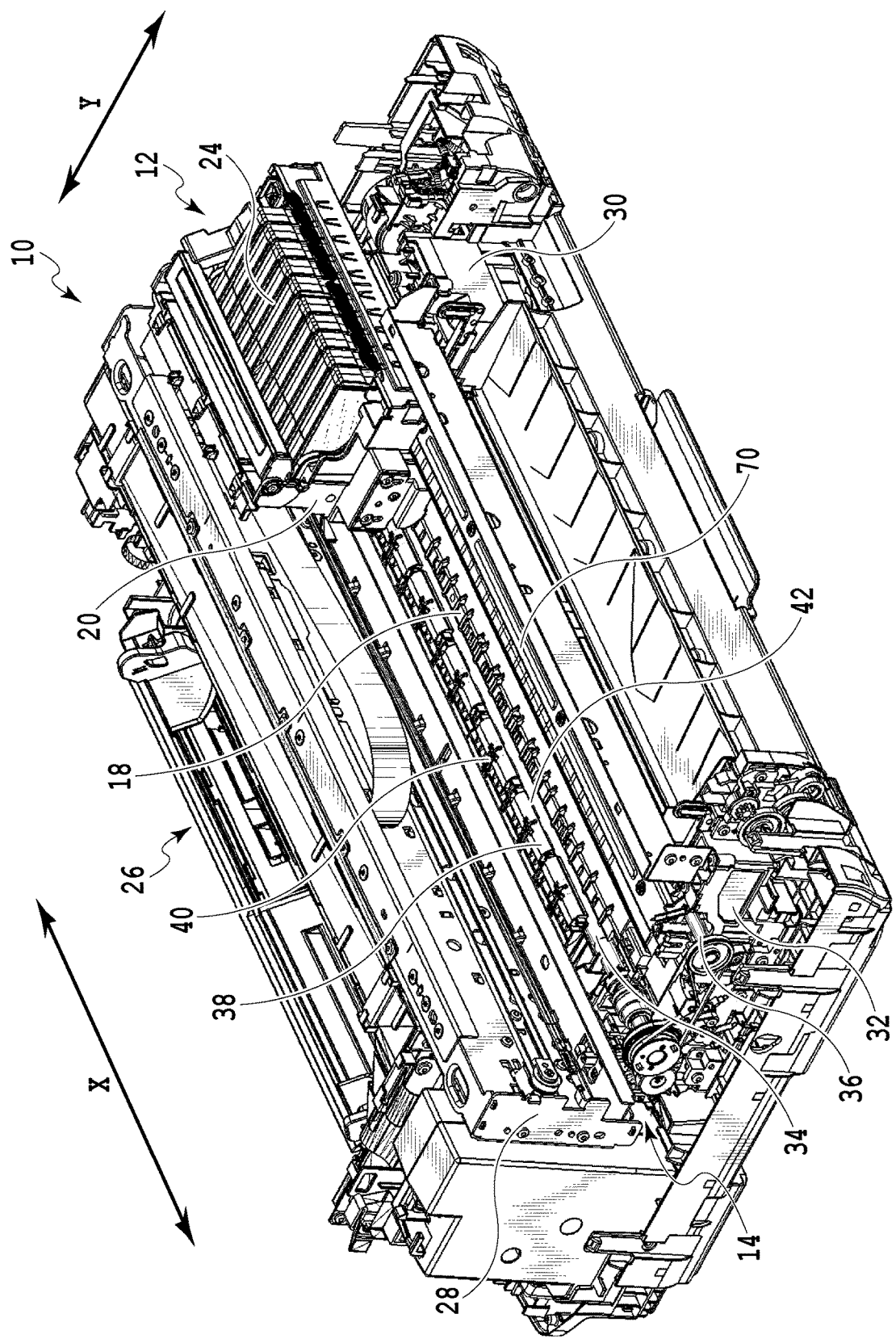
FIG. 1 is a schematic configuration diagram of a printing apparatus according to an embodiment.

FIG. 1 is a schematic configuration diagram of a printing apparatus according to an embodiment. The printing apparatus 10 illustrated in FIG. 1 is an inkjet printing apparatus that performs printing by ejecting ink to a sheet-shaped print medium in an inkjet system. The printing apparatus 10 includes a print section 12 that performs printing on a print medium and a conveyance section 14 that conveys a print medium. Note that the overall operation of the printing apparatus 10 is controlled by the control section 16 (see FIG. 11).

<Print Section>

The print section 12 includes the platen 18 extending in the X direction that intersects (in the present embodiment, orthogonally) with the Y direction, which is the conveyance direction, so as to support the print medium conveyed by the conveyance section 14. Further, the print section 12 includes the print head 22 (see FIG. 2) that is mounted on the carriage 20, which is movable in the X direction, to perform printing by ejecting ink to the print medium conveyed by the conveyance section 14. Moreover, the print section 12 includes an ink tank 24 that is mounted on the carriage 20 to supply ink to the print head 22.

This print section 12 performs printing operation in which ink is ejected to the print medium supported by the platen 18 while the print head 22 is moved in the X direction in order to print an image per one scanning. Thereafter, the conveyance section 14 performs conveyance operation for conveying the print medium by a predetermined amount, and, subsequently, the printing operation is performed again. In this way, the printing apparatus 10 prints an image on a print medium by alternately and repeatedly executing the printing operation and the conveyance operation.

<Conveyance Section>

The conveyance section 14 is configured to separate the print media placed on the paper feed section 26 one by one and convey the print medium to the print section 12 with high accuracy. The conveyance section 14 is attached to the sheet metal chassis 28, which is formed by bending, and the chassis 30 and 32, which are formed by molding. Specifically, the conveyance section 14 includes a conveyance roller 34 for conveying the separated print medium and a discharge roller 36 for discharging the print medium on which printing has been performed by the print section 12.

The conveyance roller 34 is configured with a metal shaft whose surface is coated with ceramic particles, and the metal parts on both sides of the shaft are supported by the bearing sections (not illustrated in the drawing) that are provided in the chassis 30 and 32. Further, the pinch roller holder 38 holds multiple pinch rollers 42 that are biased to the surface of the conveyance roller 34 by a pinch roller spring 40. In this way, the pinch rollers 42 are configured to abut on the surface of the conveyance roller 34 so that these pinching rollers 42 are associated with the conveyance roller 34. Further, the print medium is nipped by the conveyance roller 34 and the pinch rollers 42, and the print medium, which is the object to be conveyed, is conveyed by driving of the conveyance roller 34.

Figure 2:
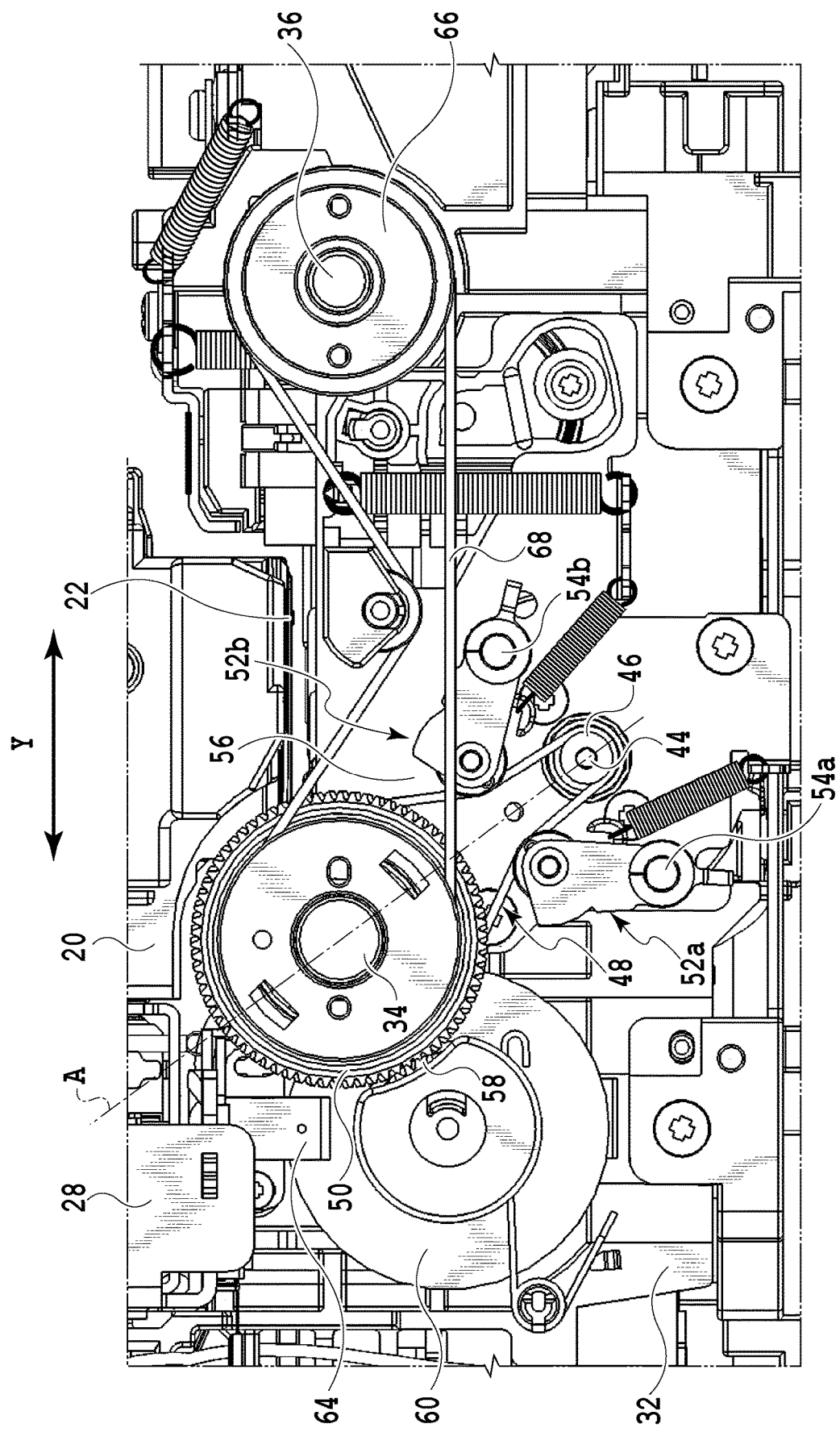
FIG. 2 is a schematic configuration diagram of a drive mechanism of a conveyance roller.
Figure 3:
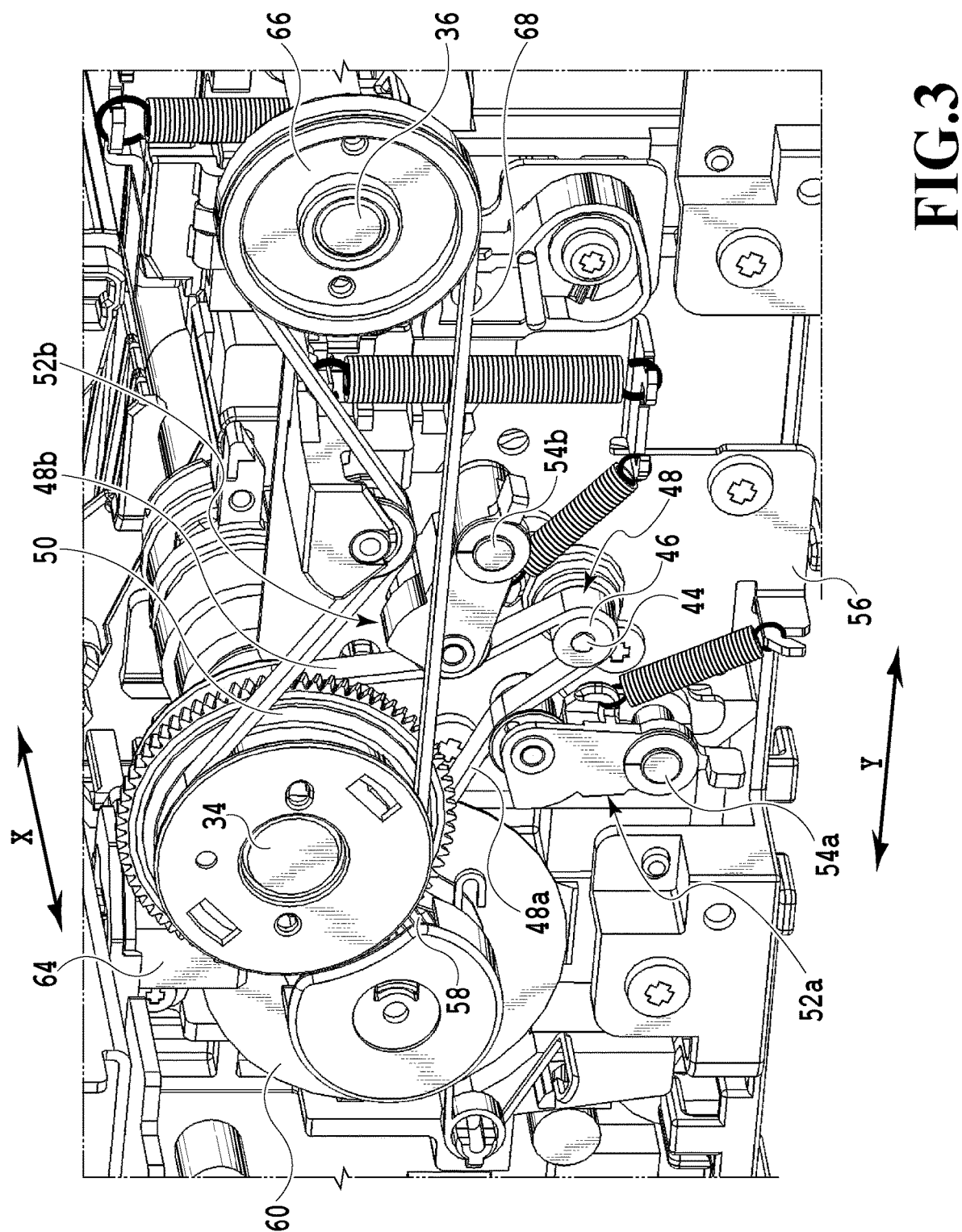
FIG. 3 is a perspective view of FIG. 2.

Next, with reference to FIG. 2 and FIG. 3, a detailed explanation is given of the drive mechanism of the conveyance roller 34. FIG. 2 is a configuration diagram mainly illustrating the drive mechanism of the conveyance roller 34, and FIG. 3 is a perspective view of FIG. 2.

The driving force (rotary force) of the conveyance roller 34 is obtained by the driving force of the conveyance motor 44, which is configured with a DC (Direct Current) motor, being transmitted from the motor pulley 46 to the pulley gear 50, which is provided on the shaft of the conveyance roller 34, via the belt 48.

More specifically, the rotation shaft of the conveyance motor 44 is provided with the motor pulley 46 that rotates integrally. The conveyance motor 44 is arranged on the side plate 56. A bearing, which is not illustrated in the drawing, is arranged on the side plate 56 at a position that is not in contact with the motor pulley 46, and the conveyance roller 34 is arranged on the bearing in a rotatable manner. The extending directions of the rotation shaft of the conveyance roller 34 and the rotation shaft of the motor pulley 46 are the same, and, in the present embodiment, the rotation shafts extend in the X direction. Further, the motor pulley 46 is formed to have a smaller diameter than the pulley gear 50, which is capable of driving the conveyance roller 34. As described above, in the present embodiment, the conveyance roller 34, which is a driven member, is driven in accordance with driving of the conveyance motor 44. Note that the driving amount of the conveyance roller 34 changes according to the driving amount of the conveyance motor 44.

The pulley gear 50 is connected to the rotation shaft of the conveyance roller 34 so as to integrally rotate with each other. The endless belt 48 is arranged on the motor pulley 46 and the pulley gear 50, so that driving of the conveyance motor 44 can be transmitted to the pulley gear 50.

The tensioner 52 abuts on the belt 48. The tensioner 52 is configured with a pair of tensioners 52a and 52b so as to abut on the spans on both sides of the belt 48, respectively. The tensioners 52a and 52b are arranged on the side plate 56 in a pivotally-movable manner with the shaft portions 54a and 54b, which extend in the same direction as the rotation shaft of the motor pulley 46 (in the present embodiment, the X direction), being the center of pivotal movement.

The pulley gear 50 is configured with two pulley portions and a gear portion, and a code wheel 60 formed with slits at a pitch of 150 to 360 lpi (lines per inch) is arranged on the same axis as the idle gear 58 that rotates via the driving of the gear portion. Further, on the chassis 32, the encoder sensor 64 is arranged at a position corresponding to the slits of the code wheel 60. In the present embodiment, the control section 16 manages the rotation amounts of the conveyance roller 34 and the discharge roller 36 by counting the number of slits of the code wheel 60 by use of the encoder sensor 64.

The discharge roller pulley 66 is connected to the rotation shaft of the discharge roller 36 so as to integrally rotate with each other. The driving transmitted from the pulley portion of the pulley gear 50 is transmitted via the timing belt 68 to the discharge roller pulley 66, so as to drive the discharge roller 36. The discharge roller 36 is configured with, for example, a rubber roller installed on a metal shaft. Multiple spurs are arranged on the spur holder 70 (see FIG. 1), which is arranged at a position facing the discharge roller 36, and these spurs are pressed against the discharge roller 36 by a spur spring, which is a coil spring in a rod shape.

The tensioner 52 is configured to allow the conveyance motor 44 to drive the conveyance roller 34 via the belt 48 with high accuracy. The tensioner 52a and the tensioner 52b are arranged at positions that are approximately axisymmetric with a symmetry axis, which is Line A (see FIG. 2) connecting the central axis of the conveyance roller 34 and the rotation shaft of the conveyance motor 44. Further, the tensioner 52a makes pressure contact with the outer surface of the span 48a of the belt 48, and the tensioner 52b makes pressure contact with the outer surface of the span 48b of the belt 48. Accordingly, tension is applied to the belt 48.

Figure 4:
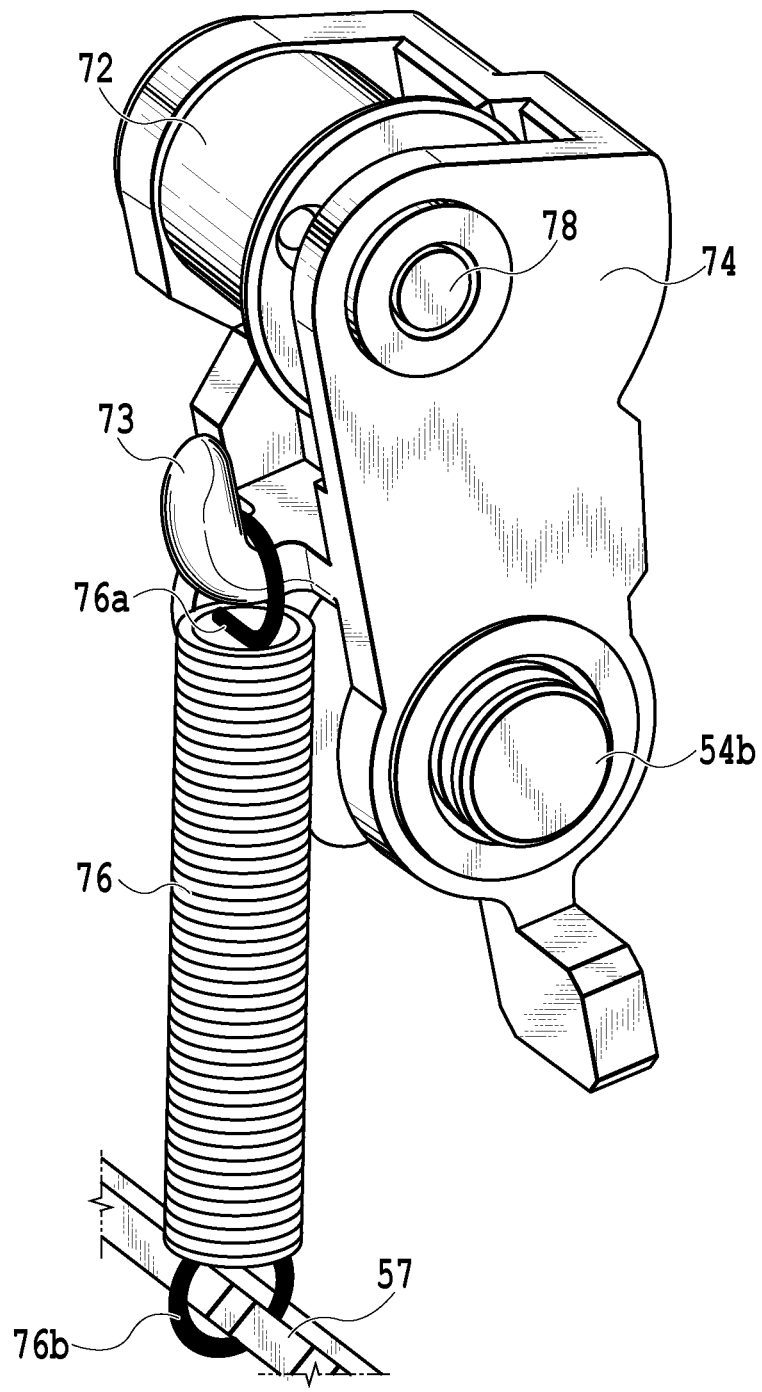
FIG. 4 is a schematic configuration diagram of a tensioner.
Figure 5:
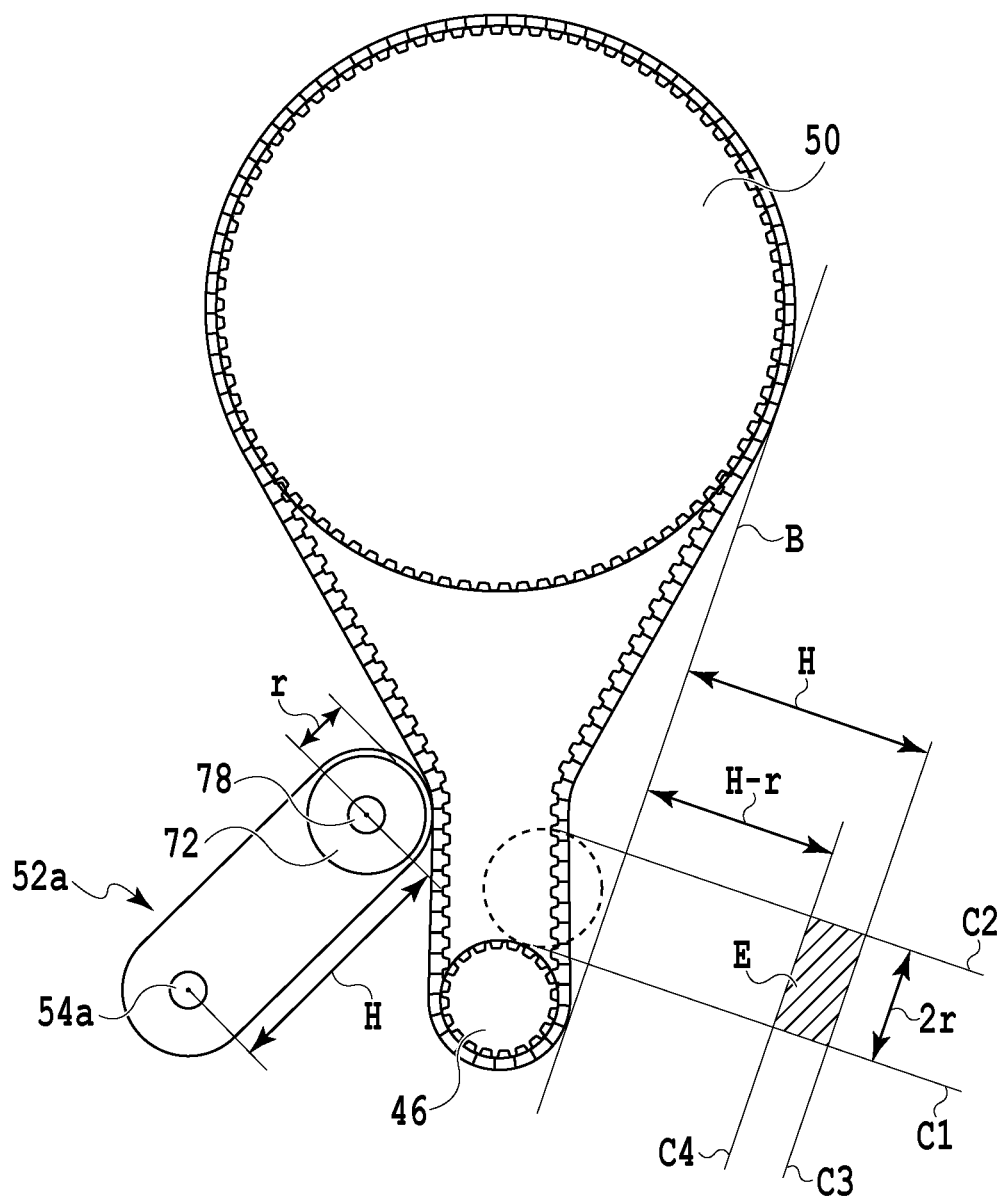
FIG. 5 is a diagram illustrating an area where the center of pivotal movement of the tensioner is to be positioned.
Figure 6:
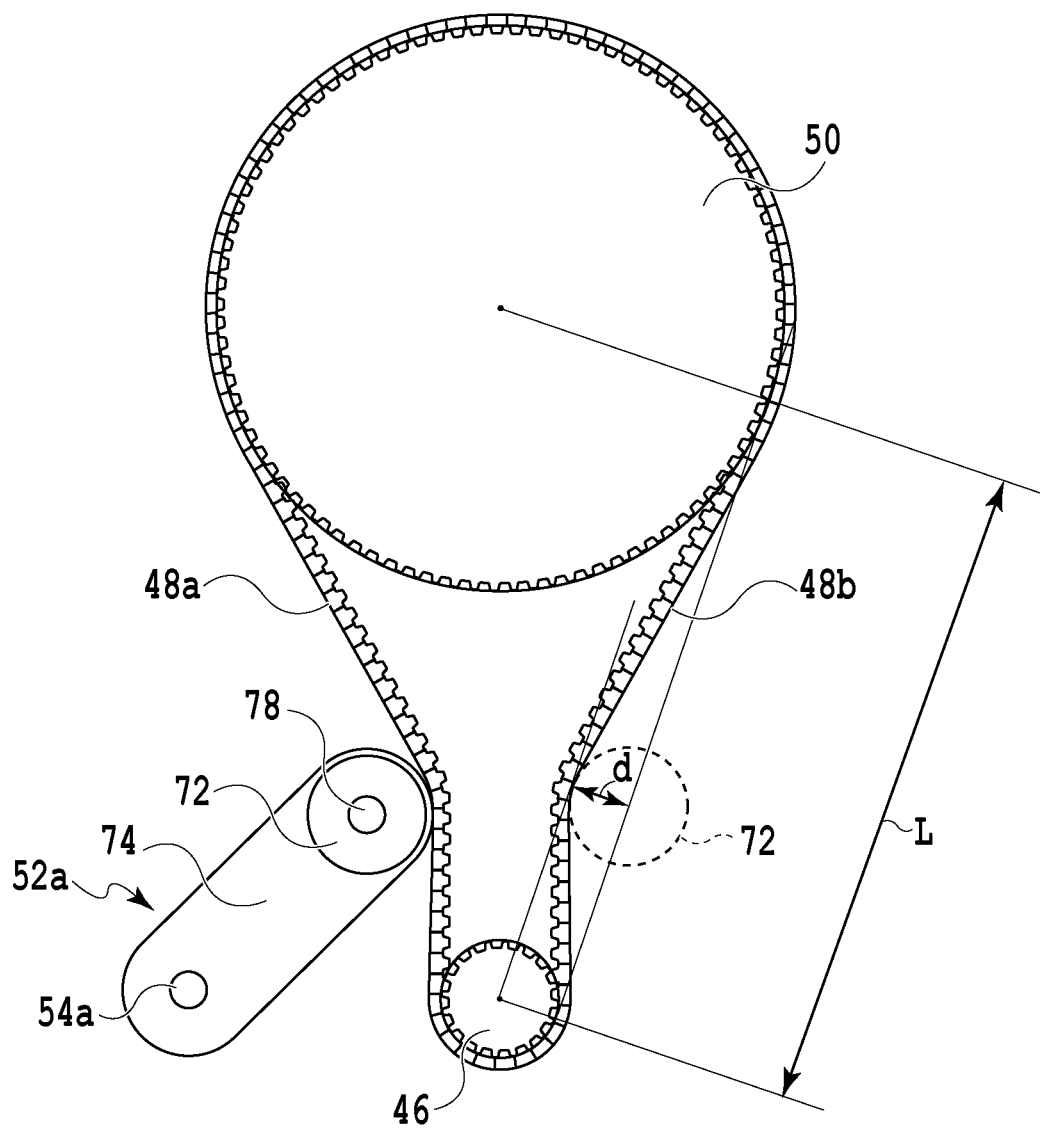
FIG. 6 is a diagram illustrating the length of a span and a deflected amount of a belt.
Figure 10:
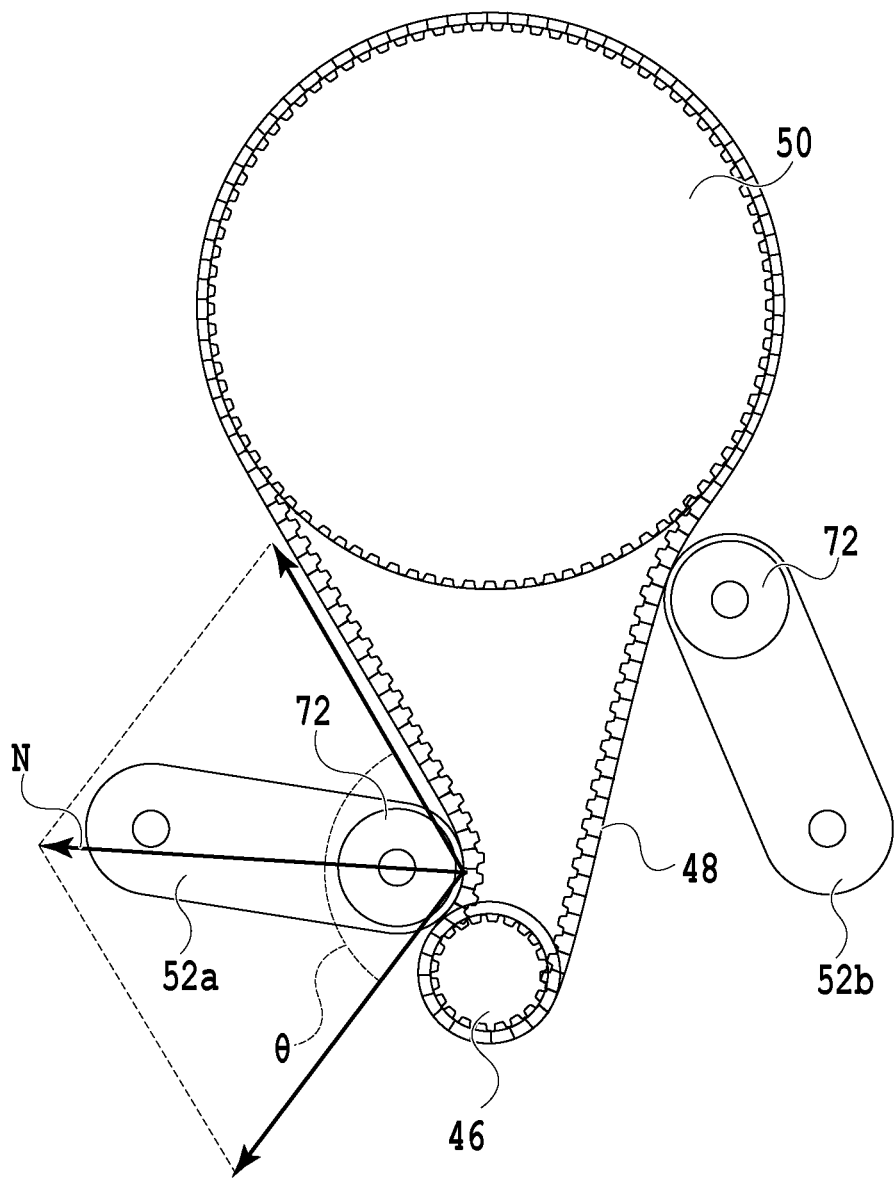
FIG. 10 is a diagram for explaining the operation of the tensioner in a case where the center of pivotal movement is positioned outside the area illustrated in FIG. 5.

Here, with reference to FIG. 4 through FIG. 10, detailed explanations are given of the configuration of the tensioner 52 and the operation thereof. FIG. 4 is a schematic configuration diagram of the tensioner 52b. FIG. 5 is a diagram illustrating the position of the center of pivotal movement of the tensioner 52. FIG. 6 is a diagram illustrating the belt 48 to which tension is applied by the tensioner 52 in a state where the motor pulley 46 is stopped. FIG. 7A is a diagram illustrating states of the belt 48 and the tensioner 52 before the motor pulley 46 rotates, and FIG. 7B is a diagram illustrating states of the belt 48 and the tensioner 52 when the motor pulley 46 rotates counterclockwise. FIG. 8A is a diagram illustrating the tensioner 52a that is in pressure contact with the belt 48 in a deflected state, and FIG. 8B is a diagram illustrating the tensioner 52a that is in pressure contact with the belt in a tensioned state. FIG. 9A and FIG. 9B are diagrams for explaining the behavior of the tensioner 52 in a case where the center of pivotal movement of the tensioner 52 is positioned below the position illustrated in FIG. 5. FIG. 10 is a diagram for explaining the behavior of the tensioner 52 in a case where the center of pivotal movement of the tensioner 52 is positioned above the position illustrated in FIG. 5.

Note that the tensioner 52a and the tensioner 52b have the same configuration as each other except that the tensioner 52a and the tensioner 52b are left-right reversals. Therefore, in the explanations of the configuration of the tensioner 52, only the configuration of the tensioner 52b will be explained, and the explanation of the tensioner 52a will be omitted.

First, with reference to FIG. 4, an explanation is given of the configuration of the tensioner 52b. The tensioner 52b includes an idler pulley 72, an arm 74, and a spring 76. One end of the arm 74 is supported by the shaft portion 54b in a rotatable manner. Further, the idler pulley 72 is arranged at the other end of the arm 74 so as to be rotatable about the shaft 78, which extends in the same direction (X direction) as the extending direction of the shaft portion 54b. One end 76a of the spring 76 is engaged with the spring hooking portion 73 provided on the arm 74, and the other end 76b is engaged with the spring hooking portion 57 provided on the side plate 56. Further, the arm 74 is biased by this spring 76 in a direction toward the position of the belt 48.

The idler pulley 72 at the tip (the other end) of the arm 74, which is biased by the spring 76, makes pressure contact with the span 48b of the belt 48. Note that the idler pulley 72 of the tensioner 52a, which is configured to be the left-right reversal, makes pressure contact with the span 48a, so that tension is thereby applied to the belt 48.

Next, with reference to FIG. 5, an explanation is given of the range of arrangement positions of the shaft portion 54, which is the center of pivotal movement of the tensioner 52. Note that, regarding the tensioner 52, the tensioner 52a is illustrated and illustration of the tensioner 52b is omitted in FIG. 5 for easy understanding.

The radius of the idler pulley 72 is referred to as "r" and the distance from the center of pivotal movement of the tensioner 52 (the center of the shaft portion 54) to the center of the shaft 78 of the idler pulley 72 is referred to as "H". Moreover, the straight line that is orthogonal to the common tangent line B, which is common to the motor pulley 46 and the pulley gear 50, and is in contact with the pulley gear 50 side of the motor pulley 46 is referred to as "C1". Further, the straight line that is parallel to the straight line C1 and is distant from the straight line C1 by 2r toward the pulley gear 50 is referred to as "C2". Furthermore, the straight line that is parallel to the common tangent line B and is distant by the distance H in the direction away from the belt 48 is referred to as "C3". Moreover, the straight line that is parallel to the common tangent line B and is distant by the distance H-r in the direction away from the belt 48 is referred to as "C4".

Here, the center of pivotal movement of the tensioner 52, that is, the arrangement position of the shaft portion 54 is positioned in the area E surrounded by the straight line C1, the straight line C2, the straight line C3, and the straight line C4. Although the details will be described later, by positioning the centers of pivotal movement of the tensioners 52a and 52b in the area E, transmission of the driving of the motor pulley 46 via the belt 48 can be preferably controlled. Note that the area E is the position obtained for the tensioners 52a and 52b, based on an experiment, so that transmission of the driving of the motor pulley 46 via the belt 48 can be preferably controlled.

Next, with reference to FIG. 6, FIG. 7A, and FIG. 7B, an explanation is given of operation of the tensioner 52. Note that, in FIG. 6, the tensioner 52a of the tensioner 52 is illustrated, and, as for the tensioner 52b, only the idler pulley 72 is indicated with the broken line for easy understanding.

Note that, in the following explanation of the operation of the tensioner 52, the lengths of the spans 48a and 48b are referred to as "L" and the deflected amount of the belt 48 being pressed and deflected by the tensioner 52 is referred to as "d", as illustrated in FIG. 6. As illustrated in FIG. 7A, before the conveyance motor 44 is driven, both the spans 48a and 48b are pressed in approximately the same manner by the tensioners 52a and 52b, so that the deflected amounts d are about the same. When a voltage is applied to the conveyance motor 44 in this state, the conveyance motor 44 and the motor pulley 46 integrally rotate counterclockwise (in the direction of Arrow I of FIG. 7A), and the belt 48 starts to move.

Here, the motor pulley 46 pushes the belt 48 toward the span 48b and pulls the belt 48 from the span 48a. Accordingly, as illustrated in FIG. 7B, the span 48b of the belt 48 becomes a deflected state and the span 48a of the belt 48 becomes a tensioned state. The deflected amount d of the belt 48 in the tensioned state approaches "O" as the tension increases. Along with this, the tensioner 52a being in pressure contact with the span 48a in the tensioned state is pushed by the belt 48 against the biasing force of the spring 76 and pivotally moves counterclockwise (in the direction of Arrow II of FIG. 7B) about the shaft portion 54a. Further, the tensioner 52b being in pressure contact with the span 48b in a loosened state presses the belt 48 with the biasing force of the spring 76 and pivotally moves counterclockwise (in the direction of Arrow III of FIG. 7B) about the shaft portion 54b.

Note that, although illustration is omitted, in a case where the conveyance motor 44 and the motor pulley 46 integrally rotate clockwise, the span 48a becomes a loosened state and the span 48b becomes a tensioned state. Accordingly, the tensioner 52a presses the belt 48 with the biasing force of the spring 76 and pivotally moves clockwise about the shaft portion 54a. Further, the tensioner 52b is pushed by the belt 48 against the biasing force of the spring 76 and pivotally moves clockwise about the shaft portion 54b.

Figure 8A:
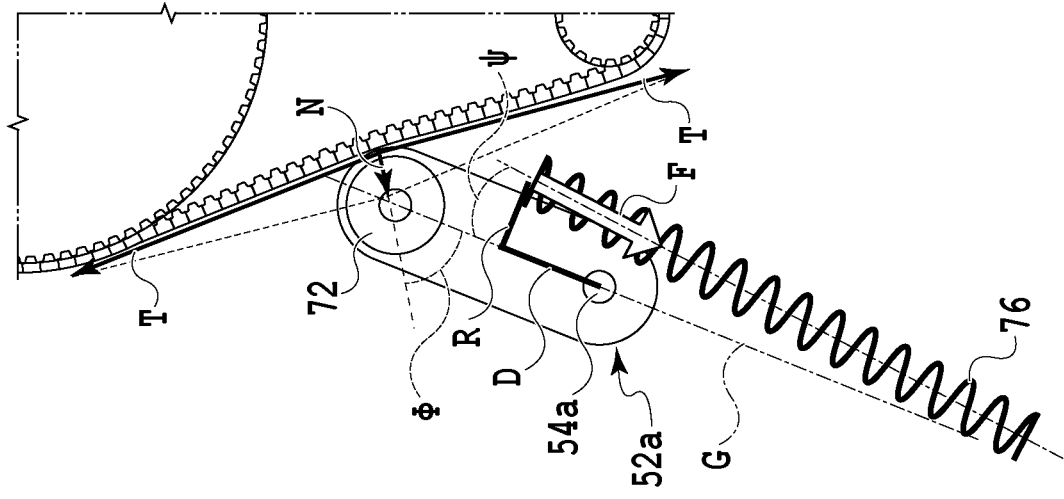
FIG. 8A and FIG. 8B are diagrams illustrating a force applied to the tensioner according to states of the belt.
Figure 8B:
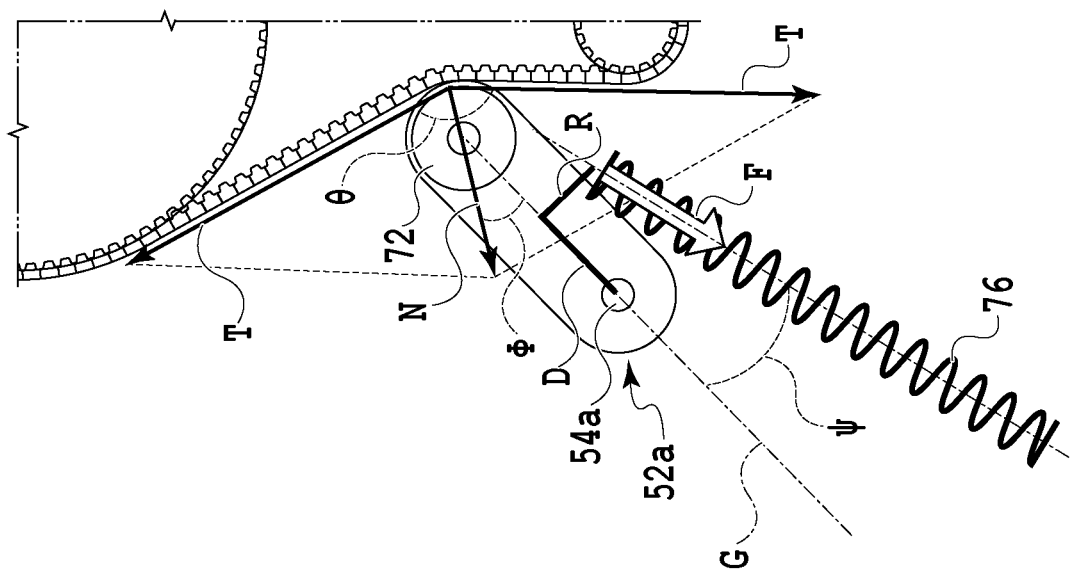

Next, with reference to FIG. 8A and FIG. 8B, an explanation is given of an effect obtained by the positions of the centers of pivotal movement of the tensioners 52a and 52b being in the area E.

As illustrated in FIG. 8A, the idler pulley 72 of the tensioner 52a receives the force N from the belt 48 with which the tensioner 52a being biased by the spring 76 is in pressure contact. The force N is a component force between the tensional forces T of the belt 48, and the direction thereof corresponds to the bisector of the angle θ formed by the belt 48 being pressed by the tensioner 52a.

The angle formed by the bisector of the above-described angle θ and Line G connecting the rotational center of the idler pulley 72 (the center of the shaft 78) and the center of pivotal movement of the tensioner 52a (the center of the shaft portion 54a) is referred to as "φ". In a case where the deflected amount d caused by pressing by the tensioner 52a is large as illustrated in FIG. 8A, the angle φ becomes smaller, compared to a case in which the deflected amount d caused by pressing by the tensioner 52a is small as illustrated in FIG. 8B. Therefore, of the force N that the idler pulley 72 receives from the belt 48, the component to be torque acting on the tensioner 52a becomes small in a case where the deflected amount d is large, and most of the force is used in a direction to compress the arm 74.

On the other hand, as illustrated in FIG. 8B, in a case where the deflected amount d caused by pressing by the tensioner 52a is small, the angle φ becomes large, so that the component to be torque acting on the tensioner 52 becomes large. Further, in this case, the angle θ becomes large, so that, geometrically, the force N that the idler pulley 72 receives from the belt 48 becomes small as well. That is, in a case where the tensioner 52a receives a large force from the belt 48 as illustrated in FIG. 8A, the tensioner 52a receives the force with the rigidity of the arm 74 in the longitudinal direction, and, in a case where the tensioner 52a cannot receive the force with the rigidity of the arm 74 as illustrated in FIG. 8B, the force itself that the tensioner 52a receives from the belt 48 has become small. Accordingly, it is possible to keep the torque acting on the tensioner 52a mostly or always small.

Further, in FIG. 8B, where the belt 48 is in a tensioned state, the spring 76 of the tensioner 52a is approximately parallel to the arm 74 (that is, the tensioner 52a). Here, the angle formed by the direction of the force F of the spring 76 and the arm 74 is referred to as "ψ", the distance from Line G to the spring hooking portion 73 of the arm 74 is referred to as "R", and the distance from the center of pivotal movement of the tensioner 52a to the spring hooking portion 73 in the longitudinal direction of the arm 74 is referred to as "D". Here, geometrically, the torque applied to the tensioner 52a is calculated by R×Fcosψ+D×Fsinψ.

In a case where the belt 48 is in a tensioned state as illustrated in FIG. 8B, sinψ is almost "0", so that an increase in the torque caused by the spring 76 can be geometrically reduced. Further, if the force F of the spring 76 and the distance R are appropriately set, it is possible to increase the biasing force in a case where the tensioner 52a pushes into the belt 48, that is, in a case where the deflected amount d is large. Moreover, it is possible to make the biasing force small in a case where the belt 48 is in a tensioned state, that is, in a case where the deflected amount d is small, and it is also possible to make that change small and gentle.

In this way, regarding the torques acting on the tensioner 52a, the change in the counterclockwise torque that the tensioner 52a receives from the belt 48 and the change in the clockwise torque caused by the spring 76 can be made small by positioning the center of pivotal movement of the tensioner 52a inside the area E. That is, even in a case where the tension of the belt 48 rises momentarily for a predetermined amount of time and an excessive force is quickly applied to the idler pulley 72 from the belt 48, such as at the start of driving, the change in the torque applied to the tensioner 52a itself is small and gentle. Accordingly, the tensioner 52a can pivotally move while the state in which the idler pulley 72 is in contact with the belt 48 is maintained.

That is, by positioning the center of pivotal movement of the tensioner 52a in the area E, displacement of the belt 48 becomes gentle, and the behavior of the tensioner 52a becomes less vibratory, so that it is possible to keep preferable controllability of the conveyance roller 34. Note that, since the tensioner 52b is the same as the tensioner 52a except that the tensioner 52b and the tensioner 52a are left-right reversals, the explanation thereof will be omitted.

Here, with reference to FIG. 9A, FIG. 9B, and FIG. 10, an explanation is given of a case in which the center of pivotal movement of the tensioner 52 is positioned outside the area E for comparison with the present embodiment. Specifically, in FIG. 9A and FIG. 9B, a case in which the center of pivotal movement of the tensioner 52 illustrated in FIG. 5 is positioned below the area E is illustrated, and, in FIG. 10, a case in which the center of pivotal movement is positioned above the area E is illustrated.

As illustrated in FIG. 9A, the angle φ is about 70° in the state where the deflected amount d caused by pressing by the tensioner 52 is large, so that a large amount of the force N that the idler pulley 72 receives from the belt 48 contributes to the torque for rotating the tensioner 52. Therefore, in a case where excessive torque acts momentarily on the tensioner 52, the idler pulley 72 of the tensioner 52 is vigorously pushed out in the direction away from the belt 48.

In a case of drastic displacement of the belt 48, such as a violent, forceful, or extreme displacement, from a deflected state to a tensioned state, it is rarely possible that the belt 48 is positioned outside the tangent line (see Line B of FIG. 5) between the motor pulley 46 and the pulley gear 50. However, when the tensioner 52 pivotally moves due to the displacement of the belt 48, the tensioner 52 pivotally moves further in the direction away from the belt 48 due to its inertia. Therefore, the tensioner 52 is separated from the belt 48 as illustrated in FIG. 9B, and the separated tensioner 52 swiftly abuts on the belt 48 due to the biasing force of the spring 76. Thereafter, the belt 48 is pressed by the tensioner 52 with the momentum, and then the tensioner 52 is bounced off again by the tension of the belt 48. In this way, the tensioner 52 is repeatedly bounced off by the tension of the belt 48, so that the tensioner 52 behaves in a vibrating manner. This makes it difficult to accurately control the pulley gear 50 to an aimed speed and rotational position.

Further, in a case where the center of pivotal movement of the tensioner 52 is positioned above the area E, if the idler pulley 72 presses the belt 48 in a deflected state, the bisector of the angle θ formed by the tensioner 52 pushing into the belt 48 passes below the center of pivotal movement of the tensioner 52 (see FIG. 10). That is, because of the force N that the idler pulley 72 receives from the belt 48, rotational torque in the clockwise direction is applied to the tensioner 52. Here, since the spring 76 is also configured to apply torque in the clockwise direction, no counterclockwise torque is generated in this configuration, so that the idler pulley 72 cannot be returned to the initial position, and the tensioner 52 stops functioning any more.

<Control Section>

Figure 11:
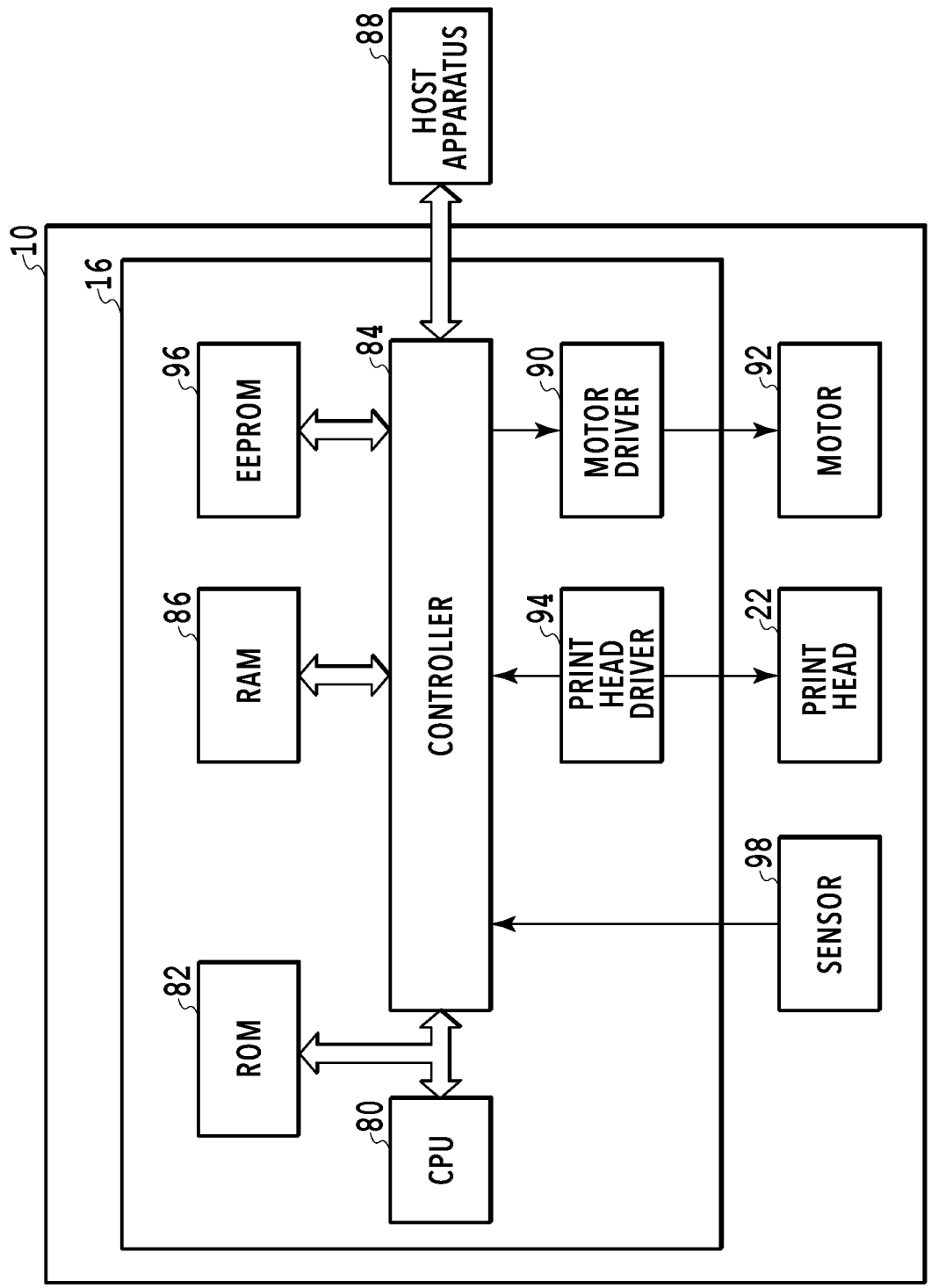
FIG. 11 is a block configuration diagram of a control section.

FIG. 11 is a block configuration diagram of the control section 16. The control section 16 includes a central processing unit (CPU) 80. This CPU 80 controls each mechanism in the printing apparatus 10 via the controller 84 according to various programs stored in the ROM 82. Here, the RAM 86 is used as a work area for temporarily saving various kinds of data and executing processing. Further, the CPU 80 performs image processing for converting image data received from the host apparatus 88, which is provided separately from the printing apparatus 10, into print signals that is printable for the printing apparatus 10. Further, based on the information resulted from the image processing, etc., the motor 92 is driven via the motor driver 90 and the print head 22 is driven via the print head driver 94, so that an image is printed on a print medium. Note that, in FIG. 11, for easy understanding, various kinds of motors in the printing apparatus 10 are indicated as the motor 92, and the motor drivers for driving respective motors are indicated as the motor driver 90.

Further, the control section 16 includes an electrically writable EEPROM 96. Various kinds of setting values and updated data are stored in the EEPROM 96, and such data is used as control parameters by the controller 84 and the CPU 80. Note that, in FIG. 11, for easy understanding, various kinds of sensors such as a temperature sensor and an encoder sensor provided in the printing apparatus 10 are indicated as the sensor 98. The CPU 80 increments, for example, the count information obtained by counting the slits with the encoder sensor 64 into a ring buffer of the RAM 86 at an appropriate timing.

<Driving Process>

In the above-described configuration, in a case where the printing apparatus 10 is instructed to start the printing operation of performing printing on a print medium, the printing apparatus 10 conveys the print medium by use of the conveyance section 14 and performs printing on the conveyed print medium by use of the print section 12, based on the instruction from the control section 16. Further, when the print medium is conveyed by the conveyance section 14, a driving process that suppresses a decrease in the controllability of the conveyance roller 34, which is caused by the belt 48 at the time of starting the conveyance, is executed.

In this driving process, the driving of the motor pulley 46 via the conveyance motor 44 is controlled in two stages. Here, FIG. 12 is a diagram illustrating a deflected state of the span 48b of the belt 48 without rotation of the motor pulley 46, which is illustrated with the broken line, and a tensioned state of the span 48b of the belt 48 with rotation of the motor pulley 46 in the direction of Arrow V, which is illustrated with the solid line.

Figure 12:
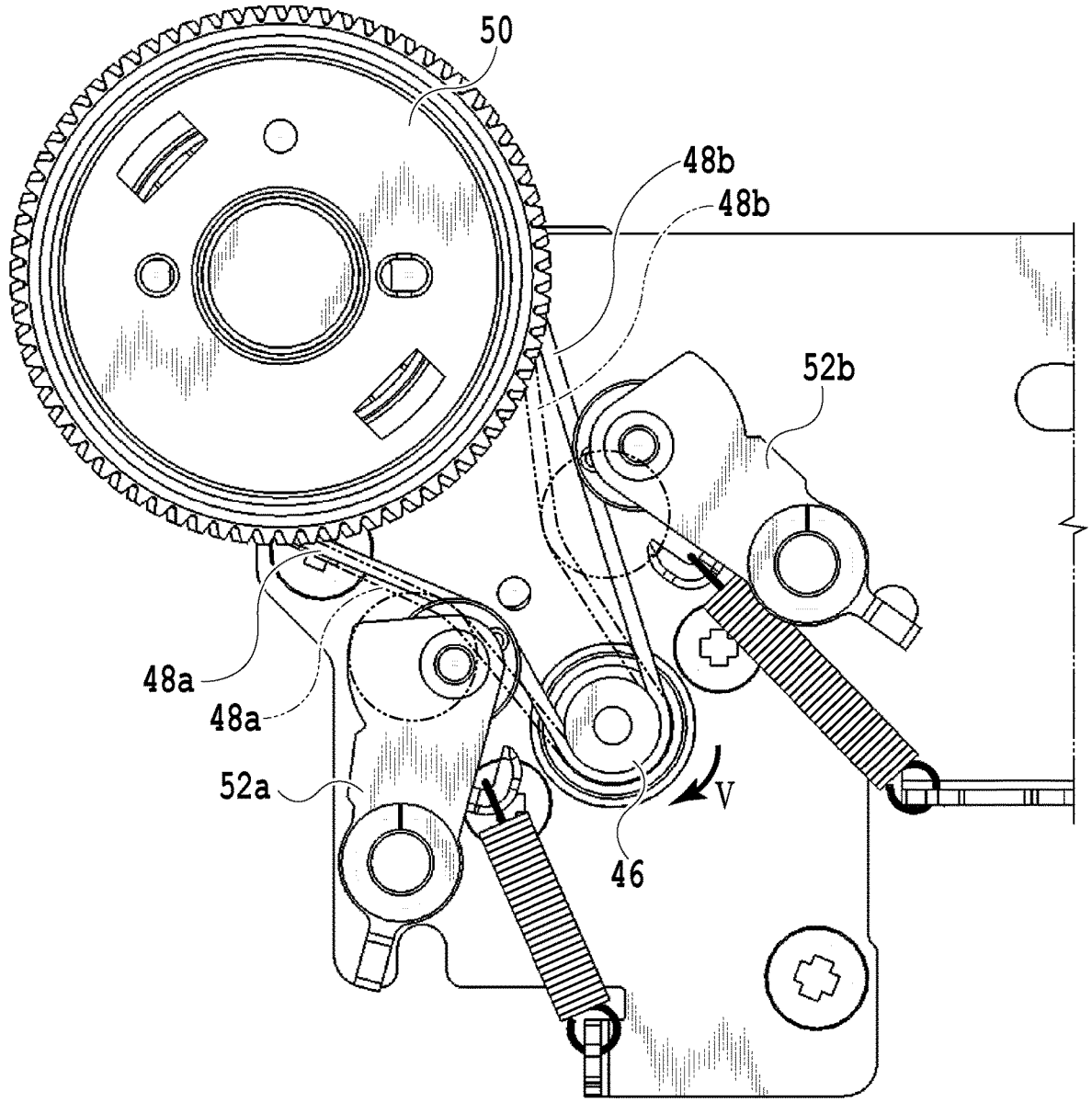
FIG. 12 is a diagram illustrating the operation of the belt and the tensioner when a motor pulley rotates.

In driving control by use of conventional technologies, when driving is started, in a case where the motor pulley 46 is rotated in the direction of Arrow V while the belt 48 is in such a deflected state as illustrated in FIG. 12, the span 48b of the belt 48 is pulled by the motor pulley 46 while the conveyance roller 34 stops. Accordingly, as illustrated with the solid line of FIG. 12, the belt 48 of the span 48b becomes a tensioned state. Here, the code wheel 60 used for managing the rotation amount of the conveyance roller 34 is positioned on the downstream side of the belt 48 in the drive transmission direction (see FIG. 2). Therefore, after the start of driving, the rotation amount of the motor pulley 46 cannot be directly grasped until the belt 48 of the span 48b becomes a tensioned state.

Therefore, in the driving process of the present embodiment, firstly, the motor pulley 46 (conveyance motor 44) is controlled with an estimation of the state of the belt 48 by the first drive. Thereafter, by the second drive, the motor pulley 46 is controlled, based on a detection result from the encoder sensor 64. That is, by the first drive, the belt of the span on the upstream side in the drive transmission direction is made to be in a tensioned state, that is, a state in which the rotation of the pulley gear 50 can be smoothly detected by the encoder sensor 64. Thereafter, the second drive is executed by the servo control based on the rotation of the conveyance roller 34.

Figure 13:
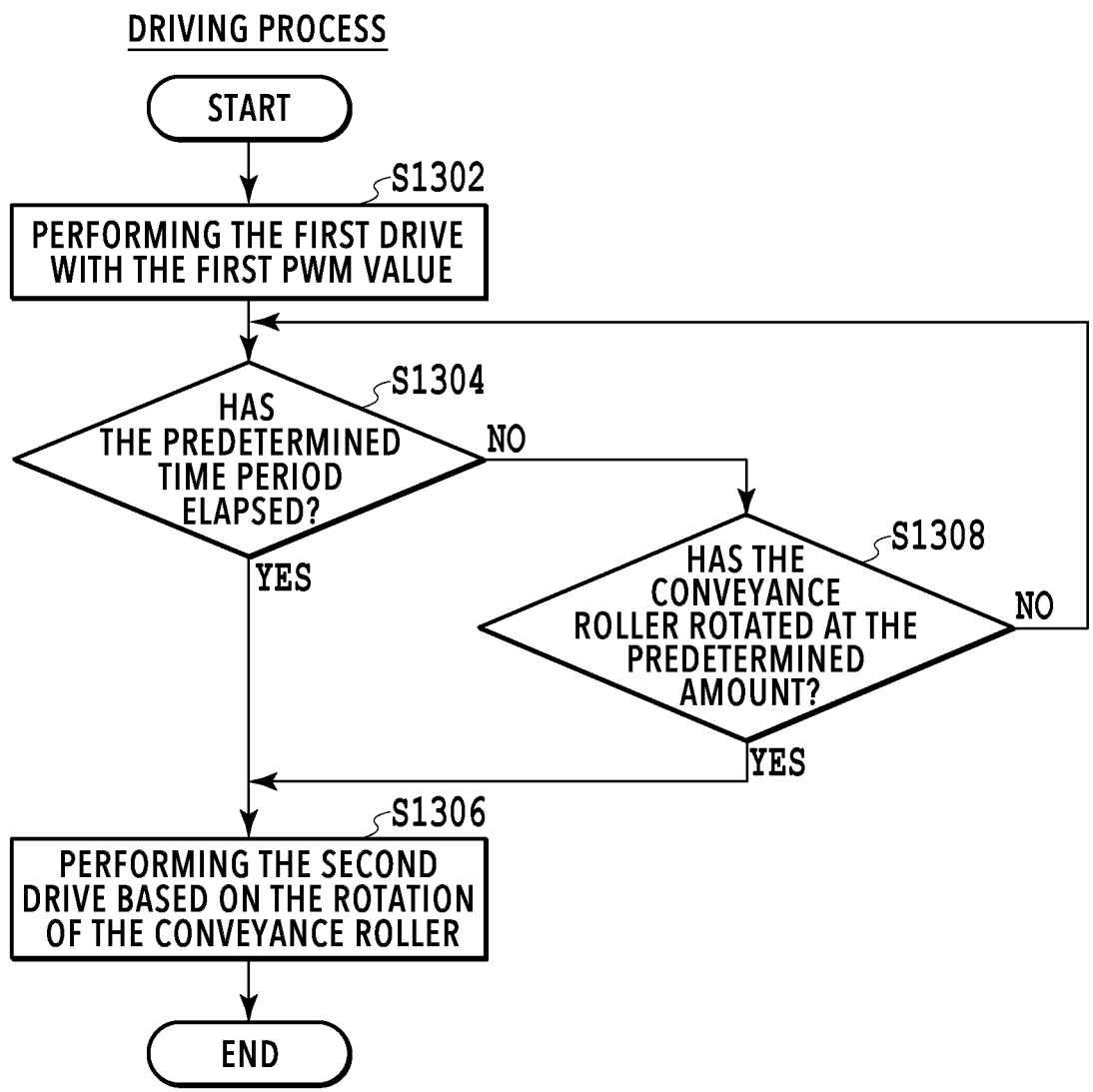
FIG. 13 is a flowchart of a driving process executed by the printing apparatus according to the first embodiment.

Hereinafter, with reference to FIG. 13, a detailed explanation is given of the driving process executed by the printing apparatus according to the first embodiment. FIG. 13 is a flowchart illustrating specific details of processing of the driving process executed by the printing apparatus according to the first embodiment. The series of these processes illustrated in the flowchart of FIG. 13 is performed by the CPU 80 loading a program code stored in the ROM 82 into the RAM 86 and executing the program code. Alternatively, a part or all of the functions in the steps of FIG. 13 may be executed by hardware such as an ASIC or an electronic circuit. Note that the sign "S" in the explanation of each process means that it is a step of the flowchart.

In a case where this driving process is started, firstly, the CPU 80 starts the first drive directed to the motor pulley 46 (S1302). That is, in S1302, for example, upon receiving a signal regarding the start of the conveyance roller 34, the CPU 80 executes the first drive in which the motor pulley 46 is driven via the conveyance motor 44, based on the first pulse width modulation (PWM) value. Note that the PWM value is a control value indicating the time percentage per predetermined time period for the current supplied to the conveyance motor 44. The first PWM value only needs to be equal to or higher than the value that can pivotally moves the tensioner 52 by tension of the belt 48 in the direction of pushing up the tensioner 52, and it is desirable that the first PWM value is set as a relatively low value so that the tensioner 52 does not pivotally move in a drastic manner. Further, the first PWM value is set in consideration of a decrease in output due to an increase in the temperature of the conveyance motor 44 and an increase in the driving load due to wear of the drive shaft, which are caused by repeated operation, etc.

Next, the CPU 80 determines whether or not a predetermined time period has elapsed (S1304). The predetermined time period is set as the time period taken for the belt 48 of the span positioned on the upstream side of the drive transmission direction to become a tensioned state from a deflected state by the driving of the motor pulley 46 with the first PWM value. That is, the predetermined time period is the time taken with the first PWM value for allowing the encoder sensor 64 to detect the rotation of the conveyance roller 34. In a case where it is determined in S1304 that the predetermined time period has elapsed, the second drive, which is performed by servo control in which the motor pulley 46 is driven with a PWM value based on the rotation of the conveyance roller 34, is executed (S1306), and the driving process ends.

On the other hand, in a case where it is determined in S1304 that the predetermined time period has not elapsed, the CPU 80 determines whether or not the conveyance roller 34 has rotated at a predetermined amount (S1308). That is, in S1308, the CPU 80 determines whether or not the rotation amount of the conveyance roller 34 has reached a predetermined amount, based on a detection result of the encoder sensor 64. The predetermined amount is, for example, a rotation amount at which it can be determined that the conveyance roller 34 can be smoothly rotated by driving of the motor pulley 46.

Here, although it is determined in the process of S1304 that the belt 48 has become a tensioned state in the case where the predetermined time period has elapsed, it is also assumable that the rotation of the conveyance roller 34 is started before the predetermined time period elapses. That is, since the predetermined time period is set in consideration of changes in the output, driving load, etc., based on the state of the conveyance motor 44, there is a possibility that the conveyance roller 34 starts rotating before the predetermined time period elapses, for example, in a case where there is not much effect of such changes. Therefore, the determination process of S1308 is provided to cope with a case in which the rotation of the conveyance roller 34 is started, that is, the rotation of the conveyance roller 34 becomes detectable in a stage where the predetermined time period has not elapsed.

In a case where it is determined in S1308 that the conveyance roller 34 has not rotated at the predetermined amount, the processing returns to S1304. Further, in a case where it is determined in S1308 that the conveyance roller 34 has rotated at the predetermined amount, the processing proceeds to S1306, so that the second drive is executed by servo control based on the rotation of the conveyance roller 34 without limiting the PWM value.

Note that, in the above-described driving process, the input of the PWM value, which is the control value, is not stopped when the first drive is switched to the second drive in the case where it is determined in S1304 that the predetermined time period has elapsed or in the case where it is determined in S1308 that the conveyance roller has rotated at the predetermined amount. If the input of the PWM value is stopped and the driving of the motor pulley 46 is cut off when the first drive is switched to the second drive, the motor pulley 46 can idle. In this case, there is a possibility that the motor pulley 46 idles in the opposite direction because of the biasing force from the tensioner 52 so that the belt 48 in a tensioned state returns to a deflected state. Therefore, by continuously inputting the PWM value without stopping the input of the PWM value when the first drive is switched to the second drive, it is possible to switch the first drive to the second drive while the belt is in a tensioned state.

Figure 14A:
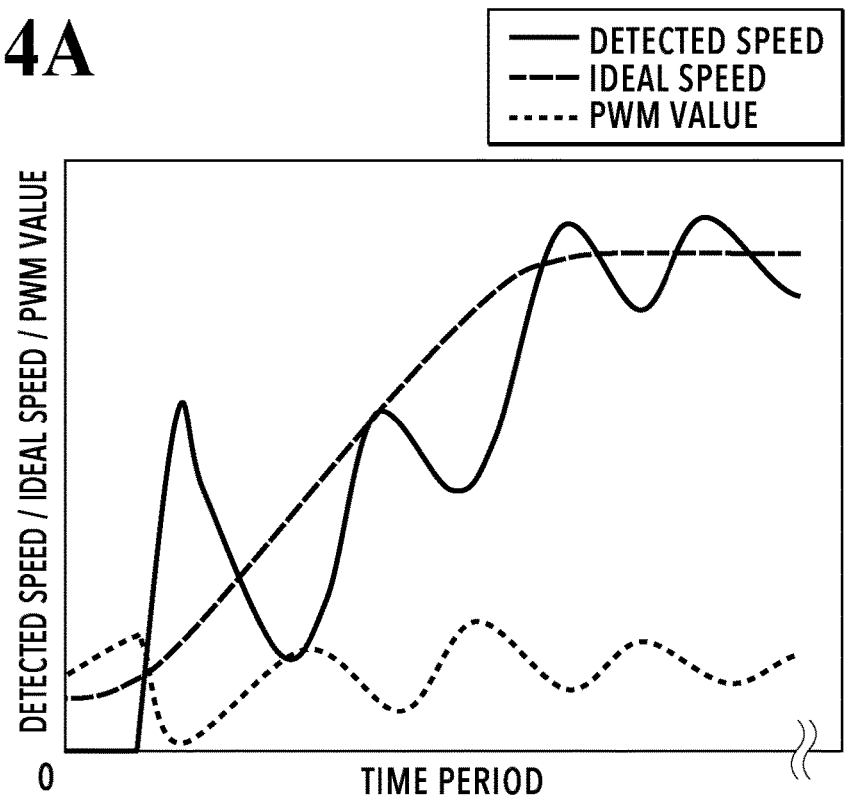
FIG. 14A and FIG. 14B are graphs illustrating changes in control values provided to the conveyance roller in a conventional technology and the first embodiment.
Figure 14B:
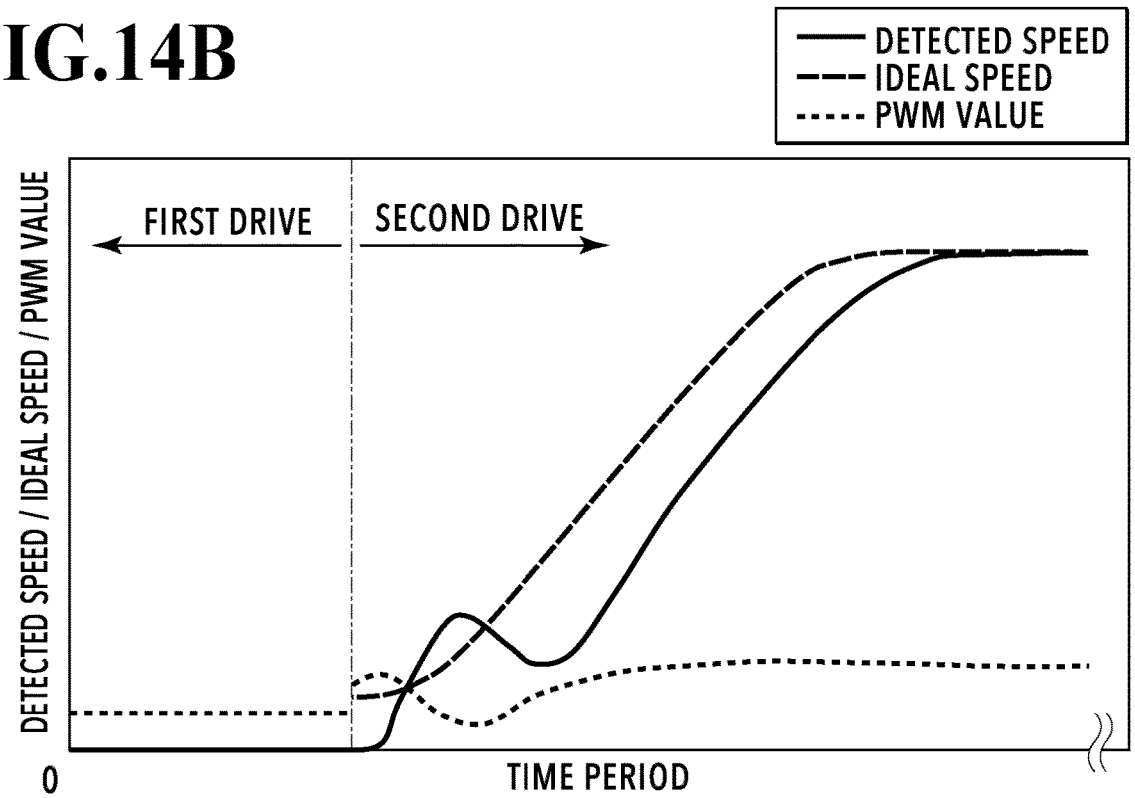

Here, FIG. 14A is a graph illustrating the ideal speed of the conveyance roller 34, the detected speed of the conveyance roller 34 in the drive control of a conventional technology, and the PWM value provided therein. FIG. 14B is a graph illustrating the ideal speed of the conveyance roller 34, the detected speed of the conveyance roller 34 in the driving process of the first embodiment, and the PWM value provided therein.

As described above, in the drive control according to the conventional technology in which the driving of the motor pulley 46 is controlled based on the rotation of the conveyance roller 34 immediately after the start of the driving, the conveyance roller 34 does not rotate until the belt 48 becomes a tensioned state from a deflected state. Therefore, as illustrated in FIG. 14A, the PWM value rises significantly in the initial stage of the driving, and the curve representing the subsequent change in the PWM value fluctuates significantly.

On the other hand, in the present embodiment, because of the driving of the two stages in which the second drive is performed after the first drive, the driving of the conveyance roller 34 can be started in a state where the belt 48 on the upstream side of the drive transmission direction is in a tensioned state in the second drive, in which drive control based on the rotation of the conveyance roller 34 is performed. Accordingly, as illustrated in FIG. 14B, the time period where the speed (rotation) is not detected in the initial stage of the second drive becomes shorter. Therefore, the PWM value becomes relatively low in the initial stage of the second drive, and the fluctuation generated in the curve indicating the subsequent change in the PWM value converges at a relatively early stage. In this way, in the present embodiment, the conveyance roller 34 can be controlled more accurately, compared to the drive control using the conventional technology.

As explained above, in the printing apparatus 10 according to the first embodiment, the motor pulley 46 is controlled with the first PWM value until the rotation of the conveyance roller 34 becomes detectable by the first drive. Thereafter, the second drive in which the servo control is performed on the motor pulley 46 based on the rotation of the conveyance roller 34 is performed. Note that, when the first drive is switched to the second drive, the PWM value is continuously input without stopping the input of the PWM value. As a result, in the printing apparatus 10 according to the first embodiment, the rotation of the conveyance roller 34 can be detected at an early stage after the start of the second drive, and the fluctuation of the PWM value can be small. Therefore, in the present embodiment, it is possible to suppress a decrease in the controllability of the conveyance roller 34.

In addition, in the printing apparatus 10 according to the first embodiment, the radius of the idler pulley 72 is referred to as "r" and the distance from the center of pivotal movement of the tensioner 52 to the center of the shaft 78 of the idler pulley 72 is referred to as "H". Moreover, the straight line that is orthogonal to the common tangent line B, which is common to the motor pulley 46 and the pulley gear 50, and is in contact with the pulley gear 50 side of the motor pulley 46 is referred to as "C1". Further, the straight line that is parallel to the straight line C1 and is distant from the straight line C1 by 2r toward the pulley gear 50 is referred to as "C2". Furthermore, the straight line that is parallel to the common tangent line B and is distant by the distance H in the direction away from the belt 48 is referred to as "C3". Moreover, the straight line that is parallel to the common tangent line B and is distant by H-r in the direction away from the belt 48 is referred to as "C4". Here, the center of pivotal movement of the tensioner 52 is positioned inside the area E surrounded by the straight line C1, the straight line C2, the straight line C3, and the straight line C4. As a result, in the printing apparatus 10 according to the first embodiment, the vibrating behavior of the tensioner 52 can be suppressed and the function thereof can be maintained. Therefore, in the printing apparatus 10, the controllability of the conveyance roller 34 can be improved.

Second Embodiment

Figure 15:
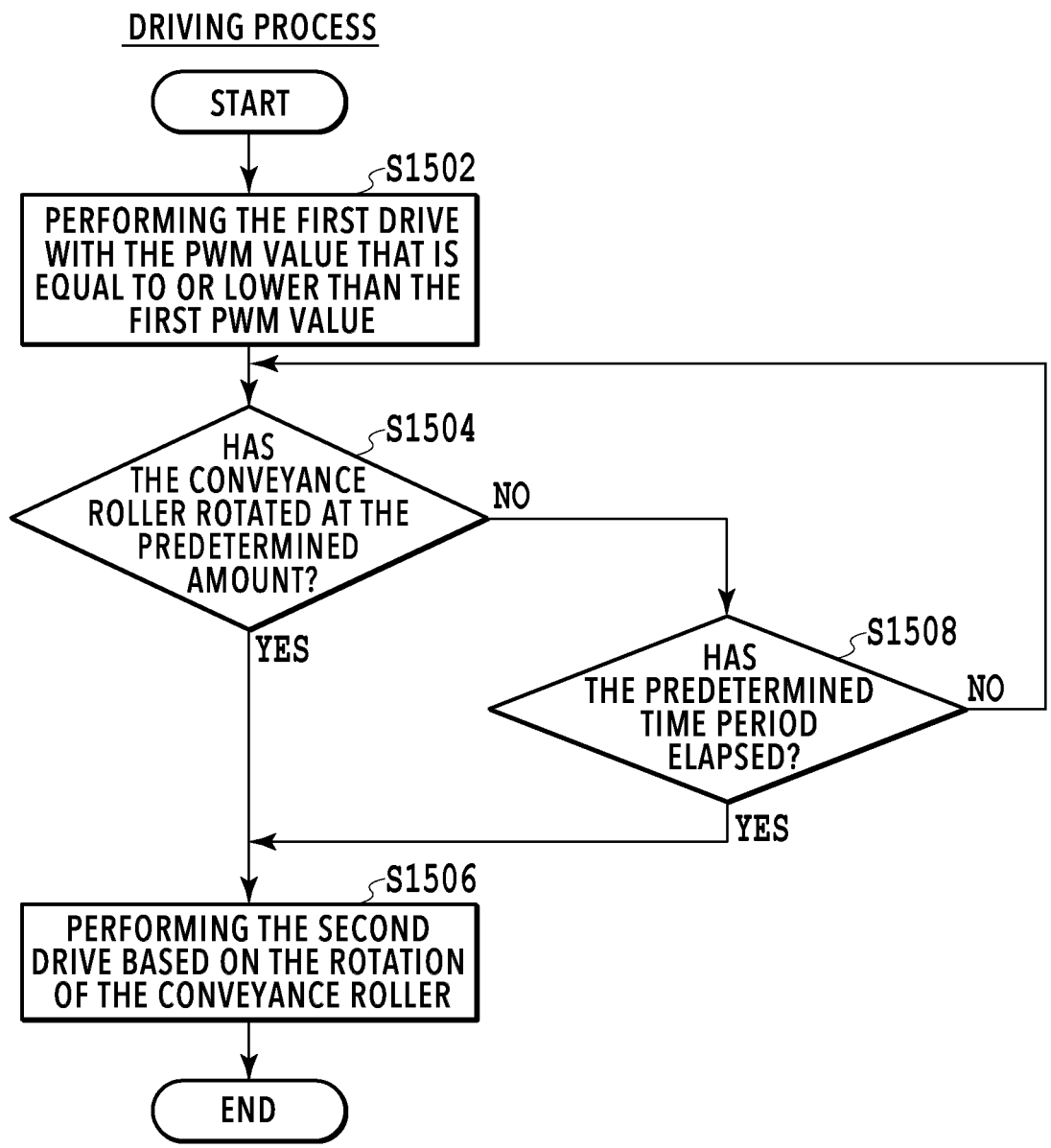
FIG. 15 is a flowchart of a driving process executed by the printing apparatus according to the second embodiment.
Figure 16A:
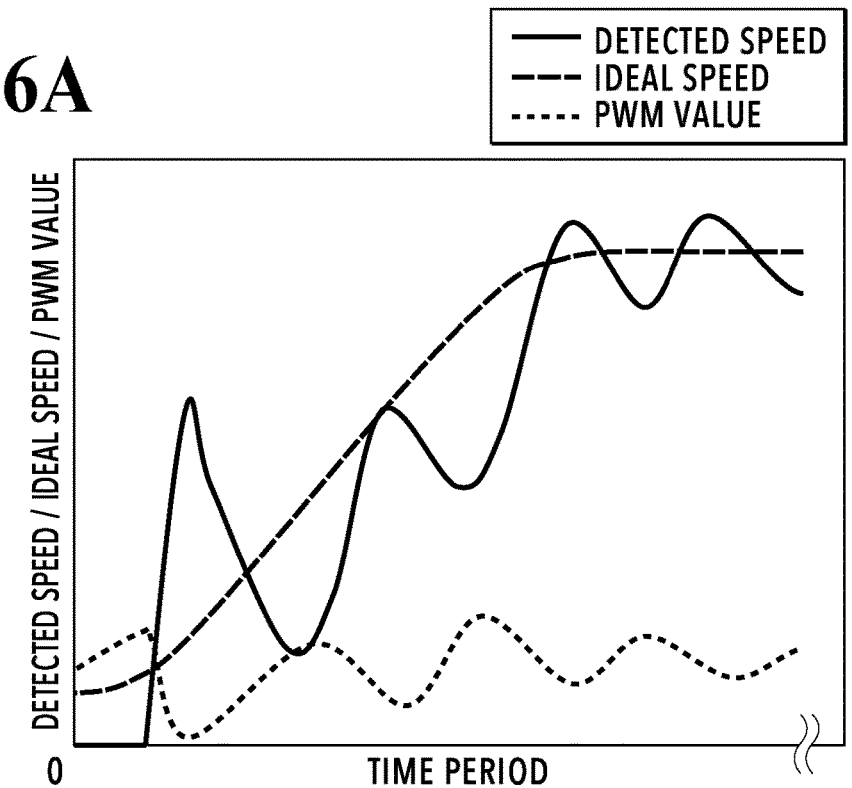
FIG. 16A and FIG. 16B are graphs illustrating changes in control values provided to the conveyance roller in a conventional technology and the second embodiment.
Figure 16B:
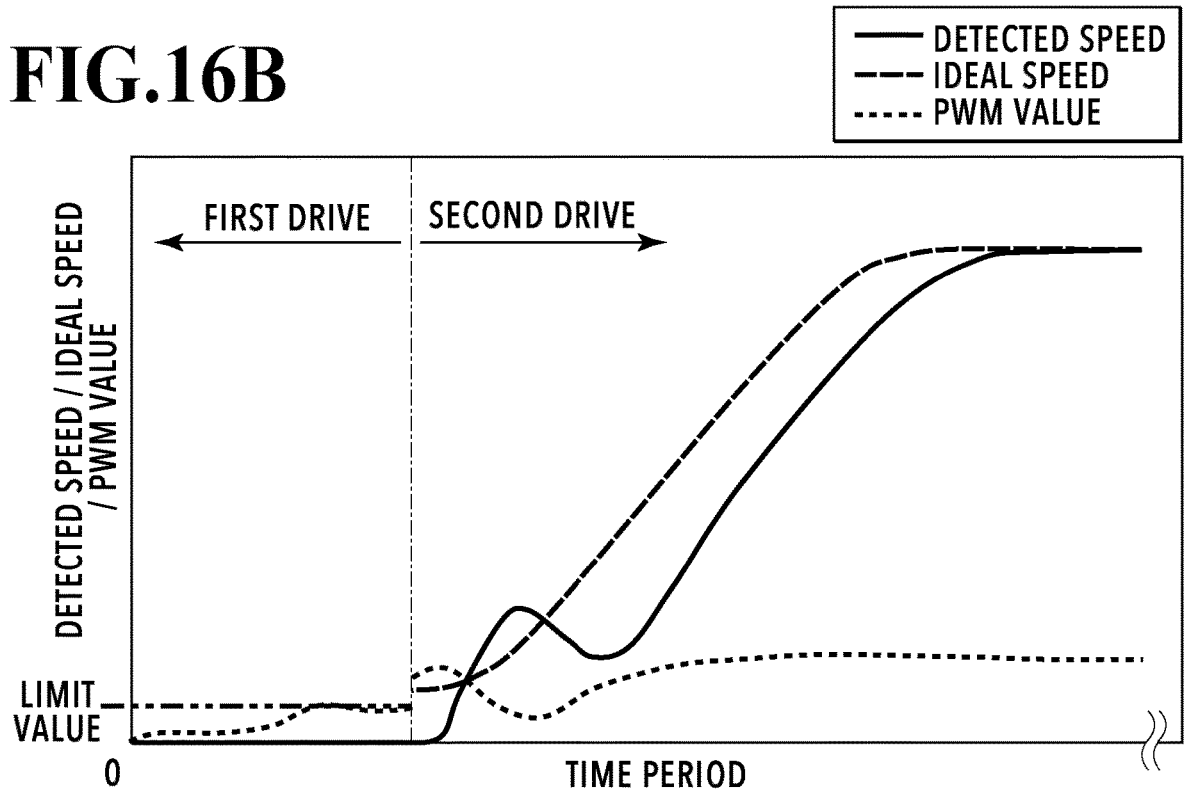

Next, with reference to FIG. 15, FIG. 16A, and FIG. 16B, an explanation is given of the printing apparatus according to the second embodiment. Note that, in the following explanation, the same or corresponding configurations as those of the printing apparatus according to the first embodiment described above are assigned with the same signs as those used in the first embodiment, so as to omit detailed explanations thereof.

This second embodiment is different from the printing apparatus according to the above-described first embodiment in terms of the driving of the motor pulley 46 via the conveyance motor 44 with the PWM value that is equal to or lower than the first PWM value, which is performed in the first drive of the driving process.

Hereinafter, with reference to FIG. 15, an explanation is given of the driving process executed by the printing apparatus according to the second embodiment. FIG. 15 is a flowchart illustrating specific details of processing of the driving process executed by the printing apparatus according to the second embodiment. In a case where the driving process is started, firstly, the CPU 80 starts the first drive directed to the motor pulley 46 (S1502). That is, in S1502, for example, upon receiving a signal regarding the start of the conveyance roller 34, the CPU 80 executes the first drive in which the motor pulley 46 is driven via the conveyance motor 44, based on a PWM value whose upper limit is the first PWM value. Note that the PWM value whose upper limit is the first PWM value is a variable value, not a preset value. Specifically, for example, as with the second drive, the first drive is performed by servo control based on the rotation of the conveyance roller 34. Note that, in such a case, there is a possibility that the PWM value increases significantly in the initial stage of the driving as in the drive control with the conventional technology (see FIG. 14A). Therefore, in the present embodiment, by limiting the PWM value in the first drive to the first PWM value or lower, an excessive PWM value is not input. Note that, in this first drive, when switching to the second drive, the tensioner 52 at least pivotally moves in the direction of being pushed up by the belt 48 because of the driving of the conveyance motor 44.

Here, in the first drive of the present embodiment, the motor pulley 46 is driven with a PWM value that is equal to or lower than the first PWM value, and therefore it is difficult to predict the time period taken for the belt 48 to become a tensioned state from a deflected state. Therefore, in the present embodiment, when the first drive is executed in S1502, firstly, whether or not the conveyance roller 34 has rotated at a predetermined amount is determined (S1504). Note that, since the specific details of processing of S1504 are the same as those of S1308 described above, the explanations thereof will be omitted.

In a case where it is determined in S1504 that the conveyance roller 34 has rotated at the predetermined amount, the second drive, which is performed by servo control in which the motor pulley 46 is driven with a PWM value based on the rotation of the conveyance roller 34, is executed (S1506), and the driving process ends. On the other hand, in a case where it is determined in S1504 that the conveyance roller 34 has not rotated at the predetermined amount, whether or not a predetermined time period has elapsed since the start of the first drive is determined (S1508). By the way, there is a case in which the load on the conveyance roller 34 increases due to an effect of wear, etc. In this case, if the motor pulley 46 is driven with a limited PWM value, there is a possibility that the conveyance roller 34 does not rotate because the torque is insufficient. In this case, although the belt 48 is in a tensioned state, the switching of the driving may not be performed because of the detection result of the encoder sensor 64. Therefore, in S1508, switching to the second drive is performed based on an elapsed time period. The predetermined time period is, for example, a time period taken for the belt 48 positioned on the upstream side of the drive transmission direction to become a tensioned state from a deflected state with a predetermined PWM value within a range of the possible PWM values.

In a case where it is determined in S1508 that the predetermined time period has not elapsed, the processing returns to S1504. Further, in a case where it is determined in S1508 that the predetermined time period has elapsed, the processing proceeds to S1506, and the second drive is executed without limiting the PWM value. Note that, in the present embodiment, when the first drive is switched to the second drive, the input of the control value is continuously performed without stopping as well.

Here, FIG. 16A is a graph illustrating the ideal speed of the conveyance roller 34, the detected speed of the conveyance roller 34 in the drive control of a conventional technology, and the PWM value provided therein. FIG. 16B is a graph illustrating the ideal speed of the conveyance roller 34, the detected speed of the conveyance roller 34 in the driving process of the second embodiment, and the PWM value provided therein.

In the present embodiment, as in the first embodiment described above, the time period where the speed is not detected in the initial stage of the second drive becomes shorter as illustrated in FIG. 16B, and the PWM value becomes relatively low in the initial stage, so that the fluctuation generated in the curve indicating the subsequent change in the PWM value converges at a relatively early stage. Accordingly, in the present embodiment, the conveyance roller 34 can be controlled more accurately, compared to the drive control using the conventional technology.

As explained above, in the printing apparatus 10 according to the second embodiment, the motor pulley 46 is driven with the PWM value that is equal to or lower than the first PWM value in the first drive. Thereafter, the second drive in which the servo control is performed on the motor pulley 46 based on the rotation amount of the conveyance roller 34 is performed. As a result, in the printing apparatus 10 according to the second embodiment, the same benefits as in the first embodiment can be obtained.

Third Embodiment

Figure 17:
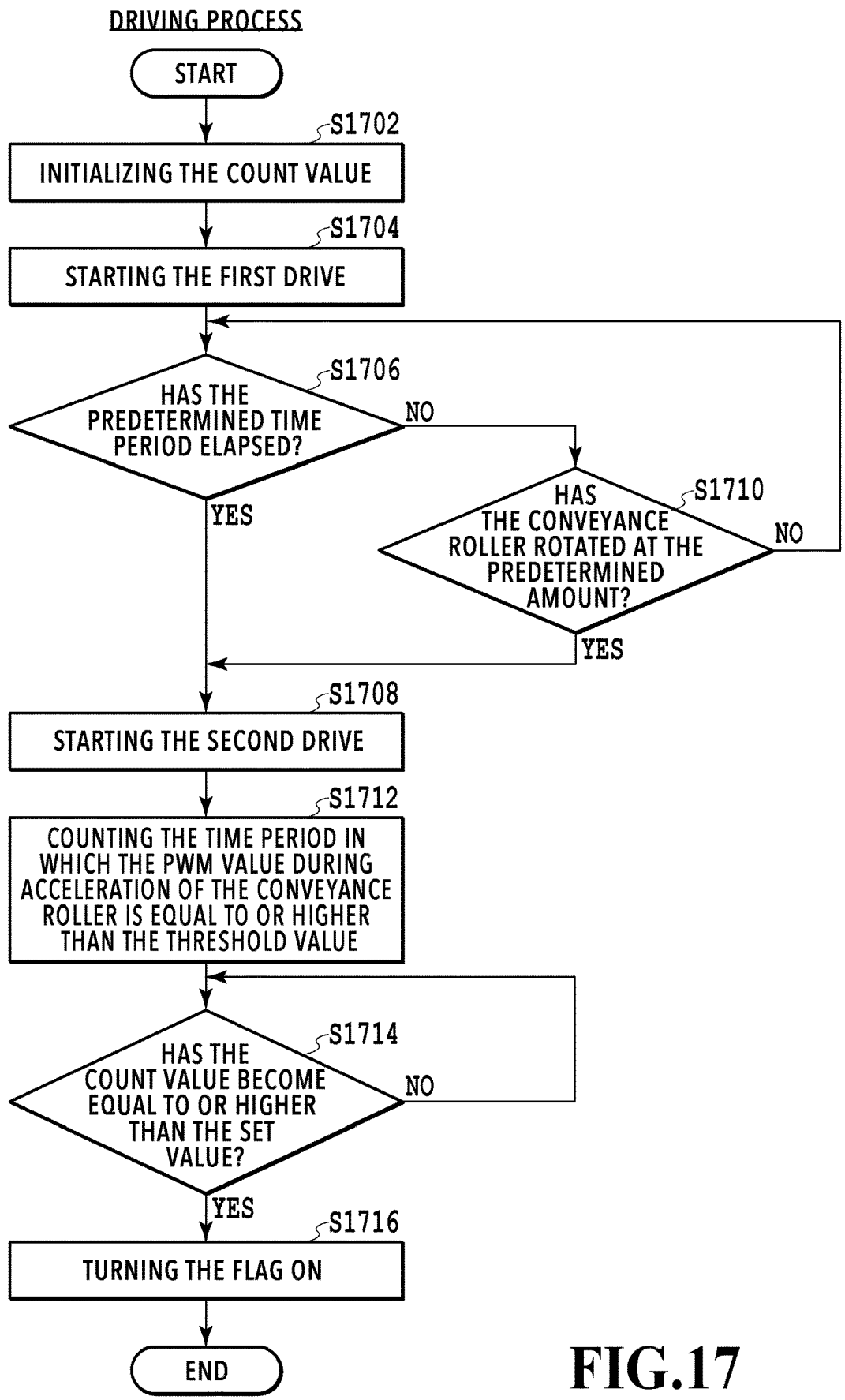
FIG. 17 is a flowchart of a driving process executed by the printing apparatus according to the third embodiment.

Next, with reference to FIG. 17, an explanation is given of the printing apparatus according to the third embodiment. Note that, in the following explanation, the same or corresponding configurations as those of the printing apparatus according to the first embodiment described above are assigned with the same signs as those used in the first embodiment, so as to omit detailed explanations thereof.

This third embodiment is different from the printing apparatus according to the above-described first embodiment in terms of the detection of a temperature rise of the conveyance motor 44 that drives the motor pulley 46, which is performed after the second drive of the driving process is started.

Hereinafter, with reference to FIG. 17, an explanation is given of the driving process executed by the printing apparatus according to the third embodiment. FIG. 17 is a flowchart illustrating specific details of processing of the driving process executed by the printing apparatus according to the third embodiment. When the driving process is started, the CPU 80 firstly initializes the counted value obtained by counting a time period (S1702). This counted value is the time period counted in S1712, which will be described later, in the previous driving process.

Then, the CPU 80 starts the first drive directed to the motor pulley 46 (S1704). Next, whether or not the predetermined time period has elapsed is determined (S1706), and, in a case where it is determined that the predetermined time period has elapsed, the second drive is performed on the motor pulley 46 (S1708). Further, in a case where it is determined in S1706 that the predetermined time period has not elapsed, whether or not the conveyance roller 34 has rotated at a predetermined amount is determined (S1710), and, in a case where it is determined that the conveyance roller 34 has not rotated at the predetermined amount, the processing returns to S1706. Further, in a case where it is determined in S1710 that the conveyance roller 34 has rotated at the predetermined amount, the processing proceeds to S1708.

Note that, since the specific details of processing of S1704 through S1710 are the same as those of S1302 through S1308 described above, respectively, the detailed explanations thereof are omitted. Further, regarding the processes from S1704 to S1710, although the same processes as those in the first embodiment described above are performed in the present embodiment, the present embodiment is not limited as such. That is, regarding the processes from S1704 to S1710, it is also possible that the same processes as those in the second embodiment described above are performed.

Next, the CPU 80 counts the time period in which the PWM value during acceleration of the driven conveyance roller 34 is equal to or higher than a threshold value (S1712). This threshold value is, for example, a value which is equal to or lower than the upper limit of the PWM value that is assumed to be necessary for rotating the conveyance roller 34 when the conveyance motor 44 is at a predetermined temperature after a temperature rise. Thereafter, whether or not the counted value has become equal to or higher than a set value is determined (S1714). The set value is, for example, a value that is preset so as to be such a time period that peaks of the fluctuation of the PWM value are not erroneously detected. Such a set value is obtained in an experiment, for example. The torque efficiency decreases in a case where the temperature of the conveyance motor 44 rises. Therefore, in a case where the temperature of the conveyance motor 44 has risen, it is necessary to increase the PWM value in order to achieve the same torque efficiency. Therefore, in the present embodiment, whether or not the torque efficiency of the conveyance motor 44 has decreased due to a temperature rise of the conveyance motor 44 is determined in S1714, so as to estimate whether the temperature of the conveyance motor 44 has risen to about a predetermined temperature.

In a case where it is determined in S1714 that the counted value is not equal to or higher than the set value, the processing returns to S1712. Further, in a case where it is determined in S1714 that the counted value is equal to or higher than the set value, the flag is turned ON (S1716) and this driving process ends. Note that, in a case where the flag is turned ON, a process such as delaying the start of the next process by a predetermined time period is executed in order to provide a time period for cooling the conveyance motor 44, for example. In this case, when the print medium is conveyed again, the driving process is executed.

In the present embodiment, after the second drive in the driving process is started, a temperature rise in the conveyance motor 44, which causes a decrease in the torque efficiency of the conveyance motor 44, is determined, and, in a case where it is determined that the temperature of the conveyance motor 44 has risen to about a predetermined temperature, the flag is turned ON.

Here, in the case of using the drive control according to the conventional technology in which the first drive is not performed as illustrated in FIG. 14A, the PWM value becomes large from the initial stage of the driving, and the fluctuation of the curve indicating the change in the PWM value is large. Therefore, there is a possibility that the PWM value exceeds the threshold value and the time period is counted even though the motor does not generate heat. Therefore, there is a possibility that temperature rises of the conveyance motor 44 will not be accurately reflected in the counted value.

On the other hand, in the present embodiment, as illustrated in FIG. 14B, the PWM value at the initial stage of the driving is relatively low, and the fluctuation of the curve indicating the subsequent change in the PWM value is small and converges at an early stage. Therefore, in the present embodiment, temperature rises of the conveyance motor 44 can be detected more accurately, compared to the case in which the conventional technology is used.

As explained above, in the driving process of the printing apparatus 10 according to the third embodiment, when the second drive, which is executed after the first drive, is started, a temperature rise of the conveyance motor 44 is detected based on the PWM value for driving the conveyance motor 44. Accordingly, it becomes possible to detect a temperature rise of the conveyance motor 44 more accurately, compared to the conventional technology in which the second drive is executed without performing the first drive.

Fourth Embodiment

Figure 18:
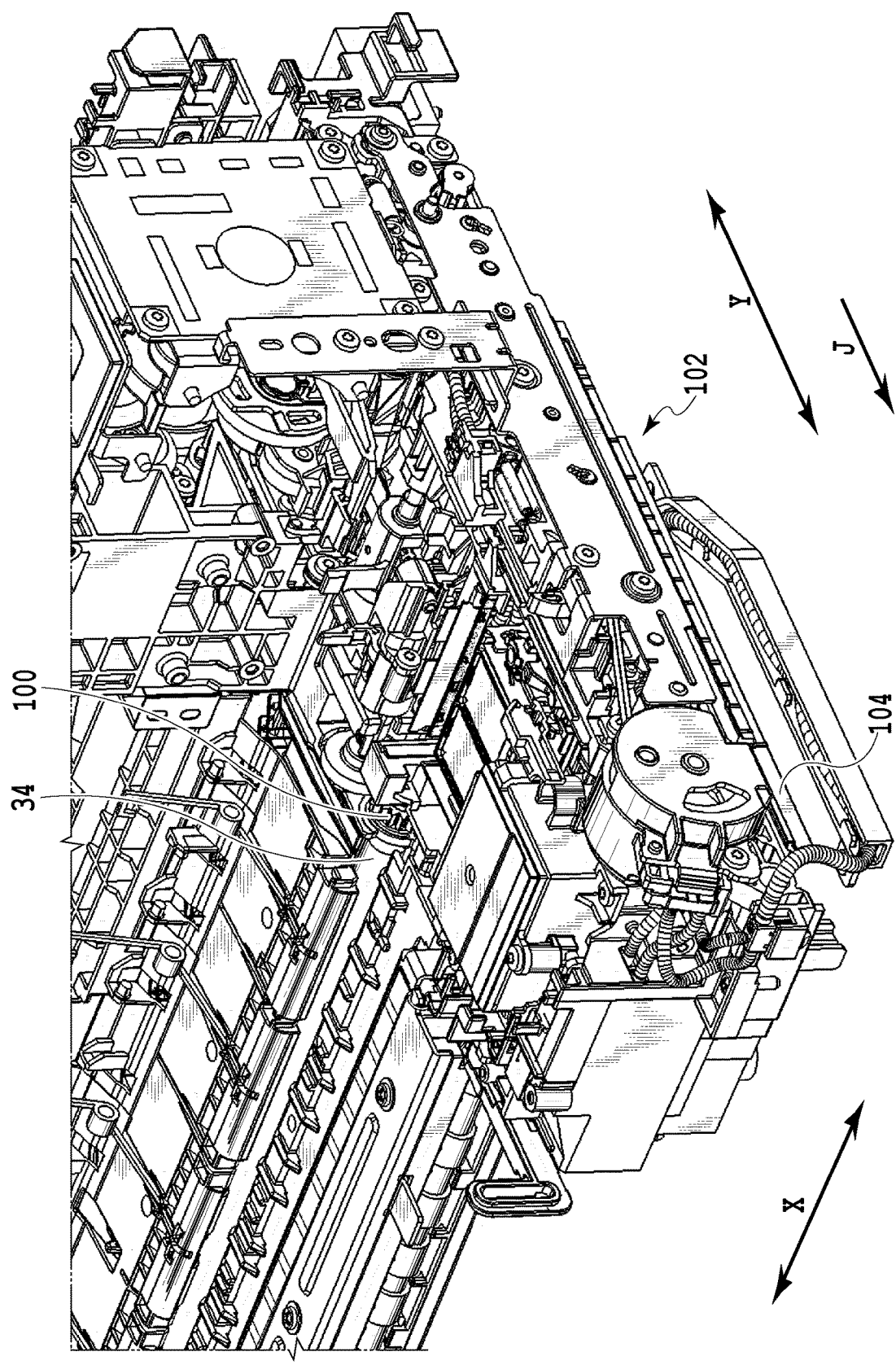
FIG. 18 is a diagram illustrating a drive mechanism of a plate cam.
Figure 19:
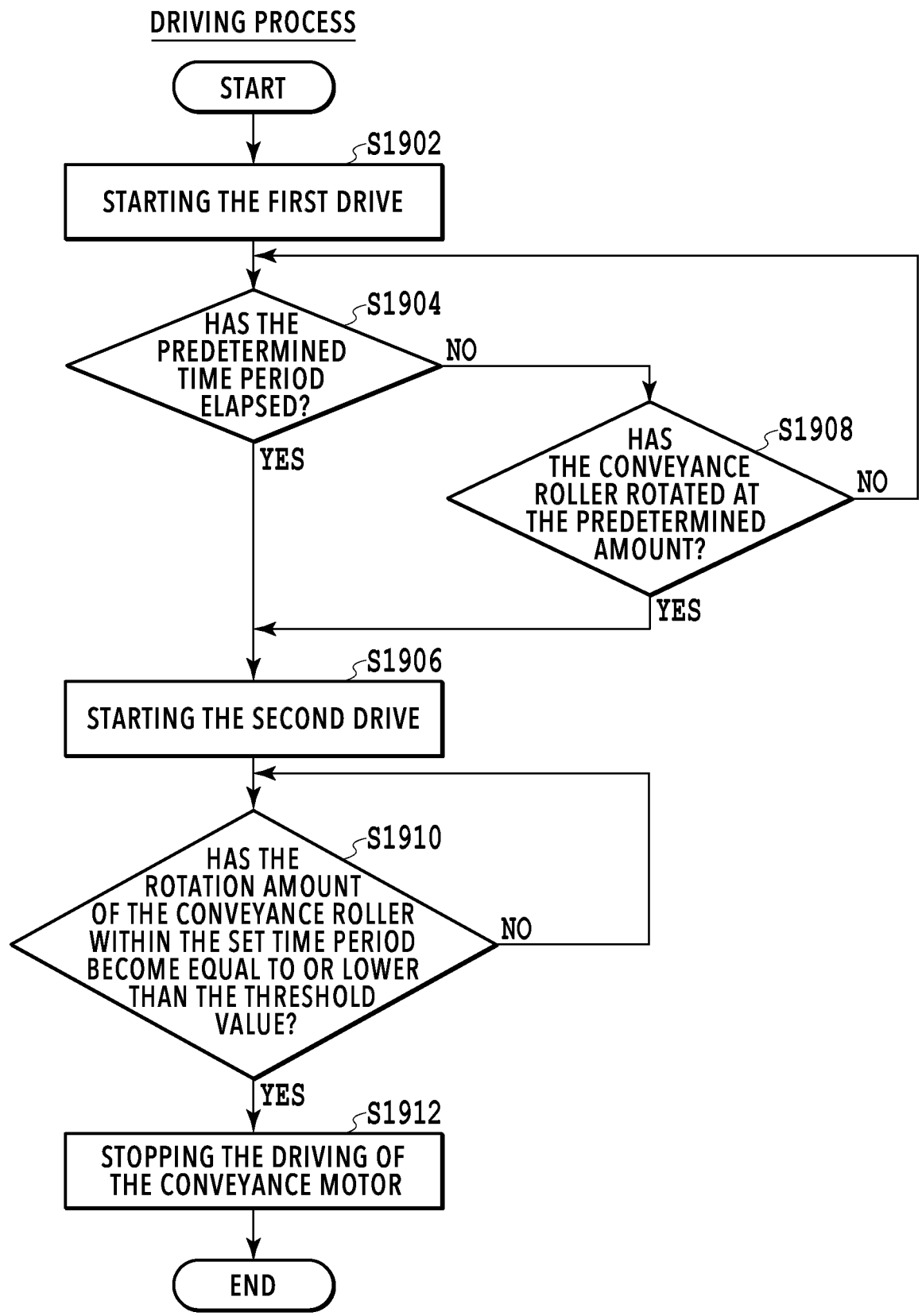
FIG. 19 is a flowchart of a driving process executed by the printing apparatus according to the fourth embodiment.

Next, with reference to FIG. 18 and FIG. 19, an explanation is given of the printing apparatus according to the fourth embodiment. Note that, in the following explanation, the same or corresponding configurations as those of the printing apparatus according to the first embodiment described above are assigned with the same signs as those used in the first embodiment, so as to omit detailed explanations thereof.

This fourth embodiment is different from the printing apparatus according to the above-described first embodiment in terms of the detection of a rotation amount of the conveyance roller 34 within a set time period, which is performed after the second drive of the driving process is started.

Hereinafter, with reference to FIG. 18 and FIG. 19, an explanation is given of the driving process executed by the printing apparatus according to the fourth embodiment. FIG. 18 is an explanatory diagram illustrating a movement mechanism of the plate cam that is movable according to the driving of the conveyance roller in the printing apparatus according to the fourth embodiment. FIG. 19 is a flowchart illustrating specific details of processing of the driving process executed by the printing apparatus according to the fourth embodiment.

Here, as illustrated in FIG. 18, the printing apparatus 10 includes the transmission gear 100, which rotates together with the conveyance roller 34, and the driven portion 102, which is driven by the driving force of this transmission gear 100 via a gear train, which is not illustrated in the drawing. The driven portion 102 includes the plate cam 104 provided with a rack gear and is configured so that the plate cam 104 can be moved via a gear train, which is not illustrated in the drawing, by the driving of the conveyance roller 34. Note that, when the print medium is conveyed by use of the conveyance roller 34, the driving force from the transmission gear 100 is not transmitted to the gear train, which is not illustrated in the drawing.

In the printing apparatus 10, when the plate cam 104 moves in the direction of Arrow J, the plate cam 104 hits a wall portion (not illustrated in the drawing) disposed at a predetermined position, so that the movement thereof is regulated and stopped. The conveyance roller 34 is stopped in synchronization with the stopping of the plate cam 104, and the stopping of the conveyance roller 34 is detected, so that the origin of the plate cam 104 is set. Note that the plate cam 104 is, for example, a constituent member of the recovery unit for preferably maintaining and recovering the ejection function of the print head 22, and, in this case, the origin of the plate cam 104 is set in order to set an origin for obtaining the position information of the recovery unit.

In the printing apparatus 10 having such a configuration, the driving process is executed when the origin of the plate cam 104 is set. In a case where the driving process is started, firstly, the CPU 80 starts the first drive directed to the motor pulley 46 (S1902). Next, whether or not a predetermined time period has elapsed is determined (S1904), and, in a case where it is determined that the predetermined time period has elapsed, the second drive is performed on the motor pulley 46 (S1906). Further, in a case where it is determined in S1904 that the predetermined time period has not elapsed, whether or not the conveyance roller 34 has rotated at a predetermined amount is determined (S1908), and, in a case where it is determined that the conveyance roller 34 has not rotated at the predetermined amount, the processing returns to S1904. Further, in a case where it is determined in S1908 that the conveyance roller 34 has rotated at the predetermined amount, the processing returns to S1906.

Note that, since the specific details of processing of S1902 through S1908 are the same as those of S1302 through S1308 described above, respectively, the detailed explanations thereof are omitted. Further, regarding the processes from S1902 to S1908, although the same processes as those in the first embodiment described above are performed in the present embodiment, the present embodiment is not limited as such. That is, regarding the processes from S1902 to S1908, it is also possible that the same processes as those in the second embodiment described above are performed.

Next, the CPU 80 determines whether or not the rotation amount of the conveyance roller 34 within a set time period has become equal to or lower than a threshold value (S1910). That is, in S1910, whether or not the plate cam 104 has hit the wall portion is determined by determining whether or not the rotation amount of the conveyance roller 34 within a predetermined time period has become equal to or lower than the threshold value. The threshold value corresponds to the rotation amount of the conveyance roller 34 at which it can be determined that the plate cam 104 has hit the wall portion, which is not illustrated in the drawing, and stopped.

In a case where it is determined in S1910 that the rotation amount of the conveyance roller 34 within the set time period is not equal to or lower than the threshold value, the processing returns to S1910. That is, in the present embodiment, the process of S1910 is repeatedly executed until it is determined in S1910 that the rotation amount of the conveyance roller 34 within the set time period is equal to or lower than the threshold value. Further, in a case where it is determined in S1910 that the rotation amount of the conveyance roller 34 within the set time period has become equal to or lower than the threshold value, it is determined that the plate cam 104 has stopped, so that the driving of the conveyance motor 44 is stopped (S1912), and this driving process ends.

In the present embodiment, after the second drive of the driving process is started, in a case where it is determined that the rotation amount of the conveyance roller 34 has become equal to or lower than the threshold value within the set time period, it is determined that the plate cam 104 has stopped, and the driving of the conveyance motor 44 for driving the conveyance roller 34 is stopped.

Here, in the case of using the drive control according to the conventional technology in which the first drive is not performed, although the rotation amount of the conveyance roller 34 is equal to or lower than the threshold value for a relatively long time period in the initial stage of the driving as illustrated in 14A, this is not because the plate cam 104 is stopped due to the wall portion, which is not illustrated in the drawing. Therefore, in the case of using the conventional technology, even though the plate cam 104 is not stopped, there is a possibility that the conveyance motor 44 is stopped because it is determined that the plate cam 104 is stopped.

On the other hand, in the present embodiment, as illustrated in FIG. 14B, the time period in which the speed is not detected in the initial stage of the driving is short, so that the conveyance roller 34 starts rotating at a relatively early stage. Therefore, it is possible to suppress an occurrence of an erroneous determination about stopping of the plate cam 104, so that the stopping of the plate cam 104 can be determined more accurately, compared to the case in which the conventional technology is used.

As explained above, in the driving process of the printing apparatus 10 according to the fourth embodiment, when the second drive, which is executed after the first drive, is started, whether the rotation amount of the conveyance roller 34 has become equal to or lower than the threshold value within the set time period is detected. Accordingly, it becomes possible to determine stopping of the plate cam 104 more accurately, compared to the conventional technology in which the second drive is executed without performing the first drive. Further, it is possible to suppress the driving of the conveyance motor 44 after the plate cam 104 hits the wall member, which is not illustrated in the drawing, and stops, which makes it possible to suppress a decrease in the durability of the conveyance motor 44.

Other Embodiments

Note that the above-described embodiments may be modified as shown in the following (1) through (5).

(1) In the above-described embodiments, although the tensioners 52a and 52b are configured to pivotally move about the shaft portions 54a and 54b, respectively, the present embodiments are not limited as such. That is, for example, it is also possible that the tensioners 52a and 52b are configured to slide.

(2) In the above-described first embodiment, although the motor pulley 46 is driven constantly with the predetermined value, that is, the first PWM value during the first drive, the present embodiment is not limited as such. That is, the PWM value in the first drive may be a variable value including the first PWM value. Specifically, it is also possible that the first PWM value is set as the upper limit, and, for example, the PWM value in the first drive is converted into a linear shape represented by a ramp function, etc., or changed into a curved shape represented by a polynomial function, a trigonometric function, etc. Alternatively, it is also possible that such a value that can pivotally moves the tensioner 52 in the direction of pushing up the tensioner 52 by the tension of the belt 48 is set as the lower limit of the first PWM value and that the lower limit value that can drastically displace the tensioner 52 is set as the upper limit value of the first PWM value, so that the PWM value is changed within this range.

(3) In the above-described embodiments, although the driving of the motor pulley 46 is controlled by controlling the driving of the conveyance motor 44 based on the PWM value, the present embodiments are not limited as such. That is, a current value or a voltage value may be used as the control value for controlling the driving of the conveyance motor 44. In this case, in the first drive of the first embodiment, the driving of the motor pulley 46 is controlled via the conveyance motor 44, based on the first current value or the first voltage value. Note that the first current value and the first voltage value only need to be such values that can pivotally move the tensioner 52 in the direction of pushing up the tensioner 52 by the tension of the belt 48 and that do not pivotally move the tensioner 52 in a drastic manner. Further, in the first drive of the second embodiment, the driving of the motor pulley 46 is controlled via the conveyance motor 44, based on the second current value which is equal to or lower than the first current value. Alternatively, the driving of the motor pulley 46 is controlled via the conveyance motor 44, based on the second voltage value which is equal to or lower than the first voltage value.

(4) In the above-described embodiments, although the printing apparatus 10 is a serial-scan type printing apparatus, the present embodiments are not limited as such, and it is also possible to use a full-line type printing apparatus. Further, although the printing apparatus 10 is configured to perform printing by an inkjet system, the present embodiments are not limited as such, and it is also possible to use various printing systems such as a dot impact system.

(5) Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(6) The above-described embodiments and various forms shown in (1) through (5) may be combined as appropriate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-026116, filed Feb. 19, 2020, which is hereby incorporated by reference wherein in its entirety.

What is claimed is:

1. A printing apparatus comprising:
a conveyance roller configured to contact and convey a print medium;
a belt configured to transmit a driving force of a motor to the conveyance roller;
a tensioner configured to be displaceable and make pressure contact with the belt to generate tension;
a detection unit configured to detect a rotation amount of the conveyance roller; and
a control unit configured to control driving of the motor in a pressure state where the tensioner is in pressure contact with the belt,
wherein, after receiving a signal, the control unit is configured to continue first control for a predetermined time period after receiving the signal where, in the first control, the motor is driven with a first control value, which is a first predetermined value, and
wherein, after the detection unit detects rotation of the conveyance roller, the control unit determines to switch, based on elapse of the predetermined time period after receiving the signal, driving of the motor from the first control to second control where, in the second control, the motor is driven with a second control value, which is based on the rotation amount detected by the detection unit.

2. The printing apparatus according to claim 1, wherein, in a case where the first control is switched to the second control, the control unit continuously inputs a control value.

3. The printing apparatus according to claim 1, wherein the control unit starts the second control in a case where a predetermined time period has elapsed since the first control is started or in a case where the conveyance roller is driven at a predetermined amount.

4. The printing apparatus according to claim 1, wherein each of the first control value and the second control value is a pulse width modulation (PWM) value, and the motor is driven continuously with the first control value and the second control value.

5. The printing apparatus according to claim 1, wherein the first control value is a value (i) that is capable of displacing the tensioner by tension of the belt in a direction of pushing up the tensioner and (ii) that does not displace the tensioner in a drastic manner that exceeds a second predetermined value.

6. The printing apparatus according to claim 5, wherein the first control value further is (iii) a displacing predetermined value limited to the value that is capable of displacing the tensioner.

7. The printing apparatus according to claim 1, wherein the first control value is a variable value (i) that is capable of displacing the tensioner by tension of the belt in a direction of pushing up the tensioner and (ii) that is equal to or lower than a value that does not displace the tensioner in a drastic manner that exceeds a third predetermined value.

8. The printing apparatus according to claim 1, wherein, in the second control, the control unit counts a time period in which a control value is equal to or higher than a threshold value and, in a case where a counted value becomes equal to or higher than a set value, it is detected that the motor generates heat.

9. The printing apparatus according to claim 1 further comprising a movement unit configured to move according to driving of the conveyance roller and configured so that movement of the movement unit is regulated at a predetermined position,
wherein, in the second control, the control unit stops the driving of the motor in a case where a driving amount of the conveyance roller within a set time period becomes equal to or lower than a threshold value.

10. The printing apparatus according to claim 1,
wherein the belt is in an endless shape wrapped around a first pulley, which is configured to be rotated by the driving of the motor, and wrapped around a second pulley, which is capable of driving the conveyance roller,
wherein the tensioner is configured to be pivotally moved about a center of pivotal movement of the tensioner and includes a third pulley, which is configured to externally make pressure contact with the belt between the first pulley and the second pulley, and wherein, if a radius of the third pulley is "r" and a distance between the center of pivotal movement of the tensioner and a rotational center of the third pulley is "H", the center of pivotal movement of the tensioner is at a position (i) closer to the first pulley relative to the second pulley and (ii) between "H" and "H− r" in a direction away from the belt relative to a common tangent line that is common to the first pulley and the second pulley.

11. The printing apparatus according to claim 10, wherein the position of the center of pivotal movement of the tensioner further is between (iii) a first straight line, which is orthogonal to the common tangent line and is in contact with a second pulley side of the first pulley, and (iv) a second straight line, which is parallel to and distant from the first straight line by "2r" toward the second pulley.

12. The printing apparatus according to claim 1,
wherein the tensioner has a shaft portion to move pivotally, and
wherein a spring for pressing the tensioner to the belt is arranged between the shaft portion and the belt.

13. A printing apparatus according to claim 1, wherein the control unit switches driving of the motor from the first control to the second control in a case where, before the predetermined time period is elapsed, the conveyance roller has rotated more than a predetermined amount.

14. The printing apparatus according to claim 1, wherein the signal is received at a time when a span of the belt is in a deflected state and the signal is regarding a start of the conveyance roller in connection with a start of a printing operation to perform printing on the print medium.

15. The printing apparatus according to claim 1, wherein, in a case where (i) the detection unit detects rotation of the conveyance roller, (ii) the rotation amount detected is less that a predetermine amount, and (iii) the predetermined time period after receiving the signal has elapsed, the control unit determines to switch driving of the motor from the first control to the second control based on the elapse of the predetermined time period after receiving the signal and not on the rotation amount of the conveyance roller.

16. The printing apparatus according to claim 1, wherein the first control value is a value sufficient to change a state of a span of the belt from a deflected state to a tensioned state where the change pivotally moves the tensioner by tension of a span of the belt while suppressing a decrease in controllability of the conveyance roller from movement of the tensioner at a time of starting conveyance of the print medium.

17. The printing apparatus according to claim 1, wherein the belt is wrapped around a motor pulley to be driven with the first control value and the predetermined time period is based on when a span of the belt positioned on an upstream side of a drive transmission direction is expected to transition from a deflected state to a tensioned state by the driving of the motor pulley with the first control value.

18. The printing apparatus according to claim 1, wherein the predetermined time period is a period after start of the driving of the motor and during which a rotation amount of a motor pulley to be driven with the first control value cannot be directly grasped by the detection unit until the belt becomes a tensioned state.

19. The printing apparatus according to claim 1, wherein the predetermined time period is from when the control unit receives the signal to a time taken with the first control value for allowing the detection unit to detect the rotation of the conveyance roller.

20. The printing apparatus according to claim 1, wherein, in a case where the predetermined time period has elapsed, the control unit determines to switch driving of the motor from the first control to the second control to drive the conveyance roller using the second control value without determining whether the detection unit detects the rotation of the conveyance roller.

21. The printing apparatus according to claim 20, wherein in a case where the predetermined time period has not elapsed and the control unit determines that the detection unit detects rotation of the conveyance roller, the control unit determines to switch driving of the motor from the first control to second control where, in the second control, the motor is driven with a second control value which is based on the rotation amount detected by the detection unit.

22. The printing apparatus 10 according to claim 1, wherein
first control value is based on a predetermined estimation of when the state of the belt will go from a deflected state to a tensioned state.

23. A conveyance apparatus comprising:
a conveyance roller configured to contact and convey an object;
a belt configured to transmit a driving force of a motor to the conveyance roller;
a tensioner configured to be displaceable and make pressure contact with the belt to generate tension;
a detection unit configured to detect a rotation amount of the conveyance roller; and
a control unit configured to control driving of the motor in a pressure state where the tensioner is in pressure contact with the belt,
wherein, after receiving a signal, the control unit is configured to continue first control for a predetermined time period after receiving the signal where, in the first control, the motor is driven with a first control value, which is a first predetermined value, and
wherein, after the detection unit detects rotation of the conveyance roller, the control unit determines to switch, based on elapse of the predetermined time period after receiving the signal, driving of the motor from the first control to second control where, in the second control, the motor is driven with a second control value, which is based on the rotation amount detected by the detection unit.

24. A printing apparatus comprising:
a conveyance roller configured to contact and convey a print medium;
a belt configured to transmit a driving force of a drive unit to the conveyance roller;
a tensioner configured to be displaceable and make pressure contact with the belt to generate tension;
a detection unit configured to detect a rotation amount of the conveyance roller; and
a control unit configured to control driving of the drive unit in a pressure state where the tensioner is in pressure contact with the belt,
wherein the control unit is configured to perform first control in which the drive unit is driven with a first control value which is based on other than the rotation amount detected by the detection unit, and, after the detection unit detects rotation of the conveyance roller, the control unit switches driving of the drive unit from the first control to second control in which the drive unit is driven with a second control value, which is based on the rotation amount detected by the detection unit, wherein the first control value is a value (i) that is capable of displacing the tensioner by tension of the belt in a direction of pushing up the tensioner and (ii) that does not displace the tensioner in a drastic manner that exceeds a predetermined value, wherein the drastic manner is at least one of a violent, forceful, or extreme displacement of the belt from a deflected state to a tensioned state that results in the tensioner and the belt being separated, and wherein the first control value further is (iii) a variable value that varies within a range whose lower limit is the value that is capable of displacing the tensioner and whose upper limit is a lower limit value that displaces the tensioner in the drastic manner.

25. The printing apparatus according to claim 24, wherein the first control value further is (iii) a variable value that includes the value that is capable of displacing the tensioner and varies in a shape of a line represented by a ramp function, a polynomial function, or a trigonometric function.

* * * * *